US011900801B2

(12) United States Patent
Oberhofer et al.

(10) Patent No.: US 11,900,801 B2
(45) Date of Patent: Feb. 13, 2024

(54) GENERATING A SPEEDING TICKET USING A PERSISTENTLY STORED CHARACTER CODE IN A CAMERA FOR MASKING INFORMATION ABOUT CHARACTERS OF A NUMBER PLATE OF A VEHICLE

(71) Applicant: International Business Machines Corporation, Armonk, NY (US)

(72) Inventors: Martin Anton Oberhofer, Sindelfingen (DE); Florian Mentzel, Dortmund (DE); Hien Pham The, Munich (DE); Thishanth Thevarajah, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/456,896

(22) Filed: Nov. 30, 2021

(65) Prior Publication Data
US 2023/0169854 A1  Jun. 1, 2023

(51) Int. Cl.
*H04L 9/08* (2006.01)
*G08G 1/054* (2006.01)
(Continued)

(52) U.S. Cl.
CPC .............. *G08G 1/054* (2013.01); *G06Q 10/06* (2013.01); *H04L 9/083* (2013.01); *H04L 63/0428* (2013.01); *H04L 2209/84* (2013.01)

(58) Field of Classification Search
CPC ...... H04L 9/083; H04L 63/0428; G08G 1/054
(Continued)

(56) References Cited

U.S. PATENT DOCUMENTS 8,964,984 B2    2/2015  Abl
11,283,607 B2 *  3/2022  Cristina .................. H04L 9/088
(Continued)

FOREIGN PATENT DOCUMENTS

CN        108446992 A    8/2018
DE     102017008116 B4    6/2021
(Continued)

OTHER PUBLICATIONS

"Patent Cooperation Treaty PCT Notification of Transmittal of the International Search Report and the Written Opinion of the International Searching Authority, or the Declaration", International application No. PCT/EP2022/083246, International filing date Nov. 25, 2022, dated Feb. 16, 2023, 11 pages.
(Continued)

*Primary Examiner* — Teshome Hailu
(74) *Attorney, Agent, or Firm* — Edward P. Li

(57) ABSTRACT

A computer-implemented method for generating a speeding ticket. The method includes generating a first image of at least a part of a vehicle by a first camera, detecting a first set of the characters of the number plate of the vehicle dependent on the first image, and generating a secured file by a first camera using the first set of the characters and a first character code. The method further includes generating a second image of the part of the vehicle by a second camera and detecting a second set of the characters of the number plate dependent on the second image. The method further includes generating the speeding ticket, in response to determining that the vehicle violates a speed limit and in response to verifying that the first set of the characters is equal to the second set of the characters.

19 Claims, 11 Drawing Sheets

(51) Int. Cl.
  *G06Q 10/06* (2023.01)
  *H04L 9/40* (2022.01)
(58) Field of Classification Search
  USPC .......................................................... 380/255
  See application file for complete search history.

(56) References Cited

U.S. PATENT DOCUMENTS

| | | | |
|---|---|---|---|
| 2004/0101166 A1* | 5/2004 | Williams | G01P 3/38 |
| | | | 348/148 |
| 2010/0302362 A1 | 12/2010 | Birchbauer | |
| 2012/0113262 A1* | 5/2012 | Hanisch | G08G 1/054 |
| | | | 348/149 |
| 2014/0267733 A1* | 9/2014 | Wu | G08G 1/054 |
| | | | 348/149 |
| 2015/0172056 A1 | 6/2015 | Meunier | |
| 2016/0232785 A1* | 8/2016 | Wang | G08G 1/0129 |
| 2017/0257943 A1* | 9/2017 | Hukkanen | H05K 3/0008 |
| 2018/0197416 A1 | 7/2018 | Hyde | |
| 2019/0050634 A1* | 2/2019 | Nerayoff | G06F 18/22 |
| 2021/0258151 A1* | 8/2021 | Cristina | G06F 21/602 |

FOREIGN PATENT DOCUMENTS

| | | |
|---|---|---|
| EP | 2220634 B1 | 4/2011 |
| JP | 2019028549 A | 2/2019 |

OTHER PUBLICATIONS

"License Plate Matching Techniques", Chapter 4, Travel Time Data Collection Handbook, printed on Oct. 29, 2021, 42 pages.

Kumar et al., "An Efficient Approach for Detection and Speed Estimation of Moving Vehicles", Twelfth International Multi-Conference on Information Processing—2016 (IMCIP—2016), 6 pages.

Rajvanshi, Priti, "Automatic Number Plate Recognition—Approach for Detecting the Vehicle Number Plate On-The-Go", Special Conference Issue: National Conference on Cloud Computing & Big Data, printed on Oct. 29, 2021, 7 pages.

Zmud et al., "License Plate Reader Technology: Transportation Uses and Privacy Risks", School of Law Texas A&M University, Faculty Scholarship, Nov. 2016, 89 pages.

* cited by examiner

GENERATING A SPEEDING TICKET USING A PERSISTENTLY STORED CHARACTER CODE IN A CAMERA FOR MASKING INFORMATION ABOUT CHARACTERS OF A NUMBER PLATE OF A VEHICLE

BACKGROUND

The present invention relates generally to traffic surveillance, and more particularly to a method, a system, and a camera for generating a speeding ticket.

A system for generating speeding tickets may either measure an actual speed or an average speed of a vehicle. If the average speed is measured, then first data about the vehicle, such as characters of a number plate, generated by means of a first measurement component of the system may need to be stored during a time span in which the average speed is measured. The first data about the vehicle may be transferred within a communication network for processing this data together with second data about the vehicle generated by means of a second measurement component of the system. It is known to generate a hash value of the data about the vehicle in order to increase data protection of this data.

SUMMARY

In one aspect, a computer-implemented method for generating a speeding ticket is provided. The computer-implemented method includes generating a first image of at least a part of a vehicle by a first camera, wherein the first camera is arranged at a first position of a road, where the part of the vehicle comprises a number plate of the vehicle and the number plate comprises characters. The computer-implemented method further includes detecting a first set of the characters of the number plate of the vehicle dependent on the first image. The computer-implemented method further includes generating a secured file by the first camera using the first set of the characters of the number plate and a first character code, where the secured file comprises a masked version of the first set of the characters of the number plate. The computer-implemented method further includes generating a second image of the part of the vehicle by a second camera, where the second camera is arranged at a second position of the road. The computer-implemented method further includes detecting a second set of the characters of the number plate dependent on the second image. The computer-implemented method further includes verifying whether the first set of the characters is equal to the second set of the characters, using the secured file. The computer-implemented method further includes checking whether the vehicle violates a speed limit dependent on information about an average speed of the vehicle between the first position and the second position. The computer-implemented method further includes generating the speeding ticket, in response to determining that the vehicle violates the speed limit and in response to verifying that the first set of the characters is equal to the second set of the characters.

In another aspect, a camera for generating a secured file is provided. The camera is configured for: generating a first image of at least a part of a vehicle, wherein the camera comprises a persistent memory device storing a first character code persistently and inaccessibly from outside the camera, where the part of the vehicle comprises a number plate of the vehicle and the number plate comprises characters; detecting a first set of the characters of the number plate of the vehicle dependent on the first image; and generating a secured file by the camera using the first set of the characters of the number plate and the first character code, where the secured file comprises a masked version of the first set of the characters of the number plate.

In yet another aspect, a system for generating a speeding ticket is provided. The system comprises a first camera and a second camera. The system is configured for: generating a first image of at least a part of a vehicle by a first camera, wherein the first camera is arranged at a first position of a road, where the part of the vehicle comprises a number plate of the vehicle and the number plate comprises characters; detecting a first set of the characters of the number plate of the vehicle dependent on the first image; generating a secured file by the first camera using the first set of the characters of the number plate and a first character code, where the secured file comprises a masked version of the first set of the characters of the number plate; generating a second image of the part of the vehicle by a second camera, wherein the second camera is arranged at a second position of the road; detecting a second set of the characters of the number plate dependent on the second image; verifying whether the first set of the characters is equal to the second set of the characters, using the secured file; checking whether the vehicle violates a speed limit dependent on information about an average speed of the vehicle between the first position and the second position; and generating the speeding ticket, in response to determining that the vehicle violates the speed limit and in response to verifying that the first set of the characters is equal to the second set of the characters.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
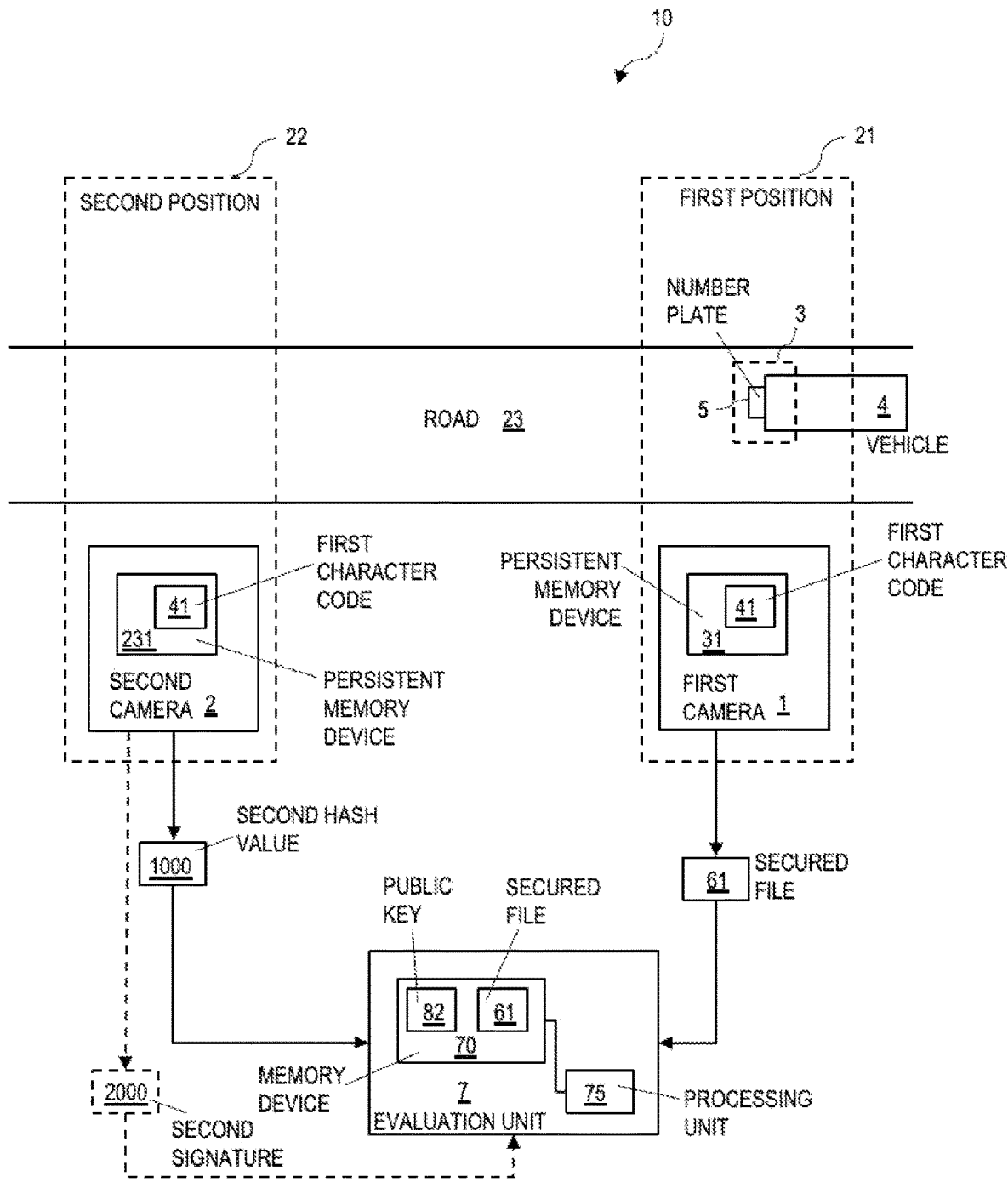
FIG. 1 is a block diagram schematically illustrating a system for generating a speeding ticket for a vehicle comprising a first camera and a second camera.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The proposed method may enable a higher data protection of the first set of the characters of the number plate, in the following also referred to as first set of the characters. This is due to the fact that the secured file which comprises the masked version of the first set of the characters is generated by means of the first character code. The data protection of the first set of the characters which may be achieved using the proposed method may be higher than a data protection achieved by using a method according to which the first set of the characters may simply be hashed, for example by using the secure hash algorithm (SHA)-256. In this case, a "rainbow table" which may comprise all combinations of characters with a length being equal to a number of characters of the first set of the characters and their corresponding hash values may be used to recover the first set of the characters. In addition, as the first character code is persistently stored in a hard-wired manner in the persistent memory device of the first camera and inaccessibly from outside the first camera, the data protection of the first set of the characters may be further increased.

The data protection of the first set of the characters may be useful for transferring the information about the first set of the characters from the first camera to the second camera. For example, such a transferring may be done in order to perform the checking whether the vehicle violates the speed limit. This transferring may be performed by sending the secured file from the first camera to the second camera. Furthermore, in one example, the information about the first set of the characters may be sent from the first camera to a state authority, for example as a part of the speeding ticket. In this case, the proposed method may enable a higher data protection of the information about the first set of the characters as well. The proposed method may further comprise deleting the secured file if the checking whether the vehicle violates the speed limit indicates that the vehicle does not violate the speed limit.

Furthermore, the secured file may be used for proving that the secured file is generated by means of the first camera. This is due to the fact that the secured file is generated using the first character code and the first character code is persistently stored in a hard-wired manner in the persistent memory device of the first camera and the first character code is stored on the memory device of the first camera inaccessibly from outside the first camera. In addition, as the first camera is arranged at the first position of the road, the secured file may serve for proving that the vehicle passed the first position of the road. In one example, the state authority and only the state authority may have access to a verification server storing the first character code in order to verify that the secured file is generated by means of the first camera. According to a further example, the state authority may have access to the verification server storing a public key of the first camera to verify that the secured file is generated by means of the first camera. According to one example, the speeding ticket may comprise the secured file. In a further example, the speeding ticket may be designed in the form of the secured file.

As the secured file is generated using the first character code and the first character code is persistently stored in a hard-wired manner in the persistent memory device of the first camera and the first character code is stored on the memory device of the first camera inaccessibly from outside the first camera, the proposed method may be considered as a highly tamper-proof method for generating the secured file. As a consequence, the proposed method may be used for generating a tamper-proof proof that the vehicle passed the first position of the road, for example by generating the secured file. In one example and in case the first character code is stored on the verification server, the first character code may only be accessible to the state authority apart from a respective processing unit of the first or the second camera as the first character code is stored on the memory device of the first camera inaccessibly from outside the first camera.

The first and the second image may comprise a front or a back of the vehicle. Thus, the part of the vehicle may be a part of the front or the back of the vehicle. In most cases, the part of the vehicle may comprise a lower part of the front or the back of the vehicle such that the number plate may be comprised by the part of the vehicle.

The first and the second camera may each comprise an optical system and the respective processing unit for generating the first image dependent on electronic signals of the optical system of the first camera and the second image dependent on electronic signals of the optical system of the second camera respectively. The first camera may generate the first image at a first point of time. A generation of the first image may comprise storing the first image on a memory of the first camera in the form of a first image file. Analogously, the second camera may generate the second image at a second point of time. A generation of the second image may comprise storing the second image on a memory of the second camera in the form of a second image file.

The first camera may be arranged at the first position of the road such that the optical system of the first camera may capture the vehicle passing by the first position of the road. The first position may be defined by a first structure of the road, such as a pillar of a bridge crossing the road, or a first further structure being arranged next to the road. The first position may be defined by first GPS coordinates. Similarly, the second camera may be arranged at the second position of the road such that the optical system of the second camera may capture the vehicle passing by the second position of the road. The second position may be defined by a second structure of the road, such as a pillar of a bridge crossing the road, or a second further structure being arranged next to the road. The second position may be defined by second GPS coordinates.

The first camera may be configured to detect the first set of the characters dependent on the first image. For example, the first camera may comprise a character recognition module for recognizing the first set of the characters. The recognition module may be configured to read and process the first image file and to perform a pattern recognition algorithm for recognizing each character of the number plate which is comprised by the first image file. The characters of the number plate which are detected by means of the first camera are referred to as the first set of the characters in this disclosure.

Analogously, the second camera may be configured to detect the second set of the characters of the number plate dependent on the second image. For example, the second camera may comprise the character recognition module or a further character recognition module for recognizing the second set of the characters of the number plate. The recognition module or the further recognition module may be configured to read and process the second image file and to perform a pattern recognition algorithm for recognizing each character of the number plate which is comprised by the second image file. The characters of the number plate which are detected by means of the second camera are referred to as the second set of the characters in this disclosure.

The term "masked version of the first set of the characters" as used herein refers to a version of the first set of the characters from which the first set of the characters either cannot be recovered in general or can only be recovered by means of the first character code or by means of a decryption key corresponding to the first character code. The term "masked" means that the first set of the characters cannot be read by only reading the masked version of the first set of the characters. Furthermore, the masked version of the first set of the characters may depend on the first set of the characters such that a change of the first set of the characters may provoke a change in the masked version of the first set of the characters. The secured file may be considered as secure because the first set of the characters cannot be read based only on the secured file. The generation of the secured file may comprise generating the masked version of the first set of the characters using the first set of the characters and the first character code.

The first camera may be configured to generate the secured file by computing the masked version of the first set of the characters dependent on the first set of the characters and the first character code, for example by using a conversion function, and writing the masked version of the first set of the characters of the number plate into the secured file. The conversion function may be a one-way function or may be an encryption function.

In one example, the first character code may be uniquely generated for the first camera. This may enhance the certainty that the secured file is generated by means of the first camera. In one example, the first character code may be generated by means of a random seed. This may enhance the chance that the first character code is a unique character code.

The persistent memory device of the first camera, in the following also referred to as first persistent memory, may be designed in the form of a read-only memory (ROM). The first character code stored in the first persistent memory cannot be electronically modified after the first persistent memory has been installed in the first camera. The first persistent memory may store the first character code in a hard-wired manner. For example, the first persistent memory may be designed in the form of a diode matrix or a mask ROM integrated circuit which is installed within the first camera. The first persistent memory may store the first character code in a hard-wired manner such that electronic connections of the first persistent memory are designed for reading the first character code from the first persistent memory. The first character code may be written on the first persistent memory in the course of a manufacturing step of the first persistent memory, for example by generating the electronic connections of the first persistent memory. In one example, the first persistent memory may be a programmable read-only memory (PROM).

Generally, the data stored in the first persistent memory, including the first character code, may not be changeable from outside the first camera. However, according to one example, the first persistent memory may be designed in the form of an erasable programmable read-only memory (EPROM) which is installed in the first camera such that the first persistent memory cannot be modified from outside the first camera. For example, the EPROM may be covered by a case of the first camera. In this case, the first camera may comprise a seal which has to be damaged for opening the case of the first camera in order to get in the interior of the first camera and expose the first persistent memory to ultraviolet light for reprogramming the EPROM. The damaged seal may indicate that the first persistent memory was changed according to this example.

The first persistent memory stores the first character code inaccessibly from outside the first camera. This may imply that the first character code is only readable by means of the processing unit of the first camera which is located inside the first camera. Thus, the first character code cannot be read by means of a further device being located outside the first camera and having a short-range or a long-range radio wave connection to the first camera. In one example, the first camera may be designed such that the first camera cannot establish a radio wave connection to the further device or any other device. In this case, output signals of the first camera may only be transferrable by wire. According to a further example, the first camera may be configured such that data may only be sent from the first camera to the further device and may not be sent from the further device to the first camera.

In the following, the verifying that the first set of the characters is equal to the second set of the characters may also be referred to as the verifying.

The information about an average speed of the vehicle may be such that the information may represent a value of the average speed of the vehicle according to one example. In another example, the information about the average speed may be such that this information indicates that the average speed is greater than the speed limit. The value of the average speed may be gained by measuring the time the vehicle takes to drive from the first position to the second position. The first camera may record the first point of time when generating the first image and the second camera may record the second point of time when generating the second image. The first camera and the second camera may be stationary. Thus, a length of the road between the first position and the second position of the road may be considered as fixed length. An evaluation unit may compute the value of the average speed of the vehicle dependent on the fixed length and a time difference between the first point of time and the second point of time. The evaluation unit may be installed in the first or second camera or may be arranged outside the first and the second camera.

According to one embodiment, the generating of the secured file may comprise generating a first string. The first string may comprise the first character code and the first set of the characters. Furthermore, the generating of the secured file may comprise computing a hash value of the first string by means of the first camera using a hash function, wherein the secured file may comprise the hash value of the first string. The hash value of the first string may be the masked version of the first set of the characters and the hash function may be the conversion function according to this embodiment. Furthermore, according to this embodiment, the generating of the secured file may further comprise generating a second string. The second string may comprise the first character code and the second set of the characters. Furthermore, the generating of the secured file may comprise computing a hash value of the second string by means of the second camera using the hash function. The verifying may comprise comparing the hash value of the first string with the hash value of the second string. The second camera may comprise a persistent memory device storing the first character code persistently in a hard-wired manner and inaccessibly from outside the second camera. Thus, according to this embodiment, the first character code may be considered as a shared secret which is stored on the first persistent memory and on the persistent memory device of the second camera simultaneously.

The term "hash value" as used herein may refer to an output value of the hash function. The hash function may be configured to calculate the output value of the hash function as a corresponding hash value of an input data of the hash function dependent on the input data and an algorithm of the hash function. The algorithm of the hash function may be, without limitation, the secure hash algorithm (SHA)-256. In particular, the hash function may be a cryptographic hash function.

The hash function may calculate the hash value of the input data such that it is not possible to un-hash the hash value of the input data to obtain the input data. The hash function and its algorithm may be designed such that a slight change in the input data of the hash function results in a completely different hash value compared to the hash value of the input data. The output value of the hash function may comprise a fixed length independent on a size of the input data of the hash function. The length of the output value of the hash function may be 256-bit, in case the algorithm of the hash function is the secure hash algorithm (SHA)-256. The input data of the hash function may be a binary file. The binary file may represent characters and/or numbers in a binary format.

According to the embodiment described above, the input data of the hash function may be the first string and the output value of the hash function may be the hash value of the first string, in one example. The hash value of the first string may be considered as a salted hash value of the first set of the characters. In order to compute the hash value of the second string, the input data of the hash function may be the second string. In this case, the output value of the hash function may be the hash value of the second string. The hash value of the second string may be considered as a salted hash value of the second set of the characters.

The persistent memory device of the second camera, in the following also referred to as second persistent memory, may be designed in the form of a read-only memory (ROM). The first character code stored in the second persistent memory cannot be electronically modified after the second persistent memory has been installed in the second camera. The second persistent memory may store the first character code in a hard-wired manner. For example, second persistent memory may be designed in the form of a diode matrix or a mask ROM integrated circuit which is installed within the second camera. The second persistent memory may store the first character code in a hard-wired manner such that electronic connections of the second persistent memory are designed for reading the first character code from the second persistent memory. The first character code may be written on the second persistent memory in the course of a manufacturing step of the second persistent memory, for example by generating the electronic connections of the second persistent memory. In one example, the second persistent memory may be a programmable read-only memory (PROM).

Generally, the data stored in the second persistent memory, including the first character code, may not be changeable from outside the second camera. However, according to one example, the second persistent memory may be designed in the form of an erasable programmable read-only memory (EPROM) which is installed in the second camera such that the second persistent memory cannot be modified from outside the second camera. For example, the EPROM may be covered by a case of the second camera. In this case, the second camera may comprise a seal which has to be damaged for opening the case of the second camera in order to get in the interior of the second camera and expose the second persistent memory to ultraviolet light for reprogramming the EPROM. The damaged seal may indicate that the second persistent memory was changed according to this example.

The second persistent memory may store the first character code inaccessibly from outside the second camera. This may imply that the first character code is only readable by means of the processing unit of the second camera which is located inside the second camera. Thus, the first character code cannot be read by means of a further device being located outside the second camera and having a short-range or a long-range radio wave connection to the second camera. In one example, the second camera may be designed such that the second camera cannot establish a radio wave connection to the further device or any other device. In this case, output signals of the second camera may only be transferrable by wire. According to a further example, the second camera may be configured such that data may only be sent from the second camera to the further device and may not be sent from the further device to the second camera.

The advantage of performing the verifying by means of the hash values of the first string and the second string is that these hash values may be computed using known hash functions, such as the secure hash algorithm (SHA)-256, which are available as open-source software. The first camera may store the hash function on the first persistent memory or on a further memory device of the first camera and the second camera may store the hash function on the second persistent memory or on a further memory device of the second camera. The first character code may be used to produce the hash values of the first and the second string in the form of the salted hash values, wherein the first character code may be considered as a salt value.

Furthermore, if the first character code is used as the shared secret according to the embodiment described above and the second camera also uses the hash function to generate the hash value of the hash value of the second string, then the information about the first set of the characters does not need to be unmasked in order to perform the verifying. This may enhance the data protection of the first set of the characters. The speeding ticket may comprise the hash value of the first string or the second string.

According to one embodiment, the first character code is generated uniquely for an individual pair of cameras, wherein the individual pair of cameras comprises the first camera and the second camera. For example, the first character code may be generated uniquely for the individual pair of cameras by generating the first character code using the random seed mentioned above. This embodiment may enhance the certainty that the vehicle passed the first and the second position of the road. The verification server may store an information about the fact that the first character code is uniquely generated for the first camera and the second camera.

According to one embodiment, the generating of the secured file may comprise generating a signature of the first set of the characters, in the following referred to as first signature, using the first character code as a common private key of the first camera and the second camera. The secured file may comprise the first signature. The first signature may be the masked version of the first set of the characters and a signature algorithm may be the conversion function according to this embodiment. According to this embodiment, the method may further comprise generating a signature of the second set of the characters using the first character code, in the following referred to as second signature. The verifying may comprise comparing the first signature with the second signature. According to this embodiment, the second camera comprises the second persistent memory described above storing the first character code persistently in a hard-wired manner and inaccessibly from outside the second camera as described above. In one example, the speeding ticket may comprise the first signature and/or the second signature.

In one example, the generating of the first signature may comprise signing a hash value of the first set of the characters using the first character code as the common private key. In this case, the signed hash value of the first set of the characters may be the first signature. The first camera may generate the hash value of the first set of the characters using the first character code and the hash function. Analogously, the generating of the second signature may comprise signing the hash value of the second set of the characters using the first character code as the common private key. In this case, the signed hash value of the second set of the characters may be the second signature. The second camera may generate the hash value of the second set of the characters using the first character code and the hash function.

Using the first signature may further enhance the certainty that the secured file is generated by means of the first or the second camera. This is due to the fact, that a certification authority has to be involved in order to obtain the common private key and a common public key corresponding to the common private key. The first signature may be considered as the secured file according to one example. A further advantage of using the first and second signature is that the first character code is not needed to verify that the first signature is created by means of the first camera or that the second signature is created by means of the second camera. Such a verification may be performed using the common public key. Hence, the first character code does not need to be stored in the verification server in order to be able to verify that the secured file is generated by means of the first camera. Instead, the common public key may be stored on the verification server. The common public key may be shared without losing data protection of the first set of the characters.

A further advantage of using the first and the second signature for the verifying may be that the common public key is not needed for the verifying. However, not using the common public key in general may not enable to prove that the secured file is generated by means of the first or the second camera. Using the common private key and not using the common public key in general may be advantageous in case the common public key is not published, i.e., not available for the public. In this case, the data protection of the first set of the characters may be further enhanced. This may be especially the case if the signed hash value of the first set of the characters is the first signature.

According to one embodiment, the method may further comprise storing the hash value of the first string locally in the first camera and sending the hash value of the second string from the second camera to the first camera.

Analogously, according to one embodiment, the method may further comprise storing the first signature locally in the first camera and sending the second signature from the second camera to the first camera. This embodiment and the previously embodiment described above may have the advantage that neither the hash value of the first string nor the first signature may have to be send to a device being located outside the first camera in order to perform the verifying. As a consequence, the data protection of the information about the first set of the characters may be increased.

According to one embodiment, the method may further comprise storing the secured file in a memory device and automatically deleting the secured file in the memory device after a given time span. The given time span may be equal to the shortest possible time span for driving on the road from the first position to the second position without violating the speed limit. According to this embodiment, the checking whether the vehicle violates the speed limit may comprise a successful reading of the secured file from the memory device. In one example, the first camera may comprise the memory device.

As the length of the road between the first position and the second position and the speed limit can be considered as given, the given time span may be calculated dependent on the length of the road between the first position and the second position and the speed limit. The method may further comprise executing a reading command for reading the secured file from the memory device in response to receiving the hash value of the second string or the second signature from the second camera by means of the first camera. In case, the secured file is not deleted the reading command may be executed successfully. The successful reading of the secured file may imply that the vehicle violates the speed limit. In case the reading of the secured file is not successful because the secured file is deleted, this may imply that the vehicle does not violate the speed limit. Thus, this embodiment may provoke that the first set of the characters or an information about the first set of the characters, such as the hash value of the first set of the characters or the first signature, is not stored longer that the given time span. As a consequence, this embodiment may enhance the data protection of the first set of the characters.

According to one embodiment, the generating of the secured file may comprise generating a first further signature of the first set of the characters using the first character code as a private key of the first camera, and the secured file comprises the first further signature. In this embodiment, the first further signature may be considered as the masked version of the first set of the characters. According to this embodiment, the verifying may comprise verifying the first further signature by means of a public key of the first camera which corresponds to the private key of the first camera and the second set of the characters. This embodiment may allow to store the first character code only on the first persistent memory which may enhance a protection of the first character code. The first camera may send the first further signature to the second camera. In one example, the second camera may perform the verifying of the first further signature dependent on the public key, the first further signature and the second set of the characters. The verifying of the first further signature may be successful if the first set of the characters is equal to the second set of the characters according to this example.

In one example, the generating of the first further signature may comprise signing the hash value of the first set of the characters using the first character code as the private key of the first camera. In this case, the signed hash value of the first set of the characters may be the first further signature. The first camera may create the hash value of the first set of the characters using the first set of the characters and the hash function. The first camera may send the first further signature to the second camera. In one example, the second camera may perform the verifying of the first further signature dependent on the public key, the first further signature and the hash value of the second set of the characters. The second camera may create the hash value of the second set of the characters using the second set of the characters and the hash function. The verifying may be successful if the hash value of the first set of the characters is equal to the hash value of the second set of the characters according to this example.

Using the first further signature may further enhance the certainty that the secured file is generated by means of the first camera. This is due to the fact, that a certification authority has to be involved in order to obtain the private key of the first camera and the public key of the first camera corresponding to the private key of the first camera. The first further signature may be considered as the secured file according to one example. A further advantage of using the first further signature is that the first character code is not needed to verify that the first further signature is created by means of the first camera. Such a verification may be performed using the public key of the first camera. Hence, the first character code does not need to be stored in the verification server in order to be able to verify that the secured file is generated by means of the first camera. Instead, the public key of the first camera may be stored on the verification server.

According to one embodiment, the generating of the secured file may comprise generating an encrypted version of the first set of the characters using the first character code as a symmetric cryptographic key of the first camera and the second camera. The encrypted version of the first set of the characters may be the masked version of the encrypted version of the first set of the characters, in this case. According to this embodiment, the secured file may comprise the encrypted version of the first set of the characters. The verifying may comprise decrypting the encrypted version of the first set of the characters by means of the first character code. Furthermore, according to this embodiment, the second camera may comprise a persistent memory device storing the first character code persistently in a hard-wired manner and inaccessibly from outside the second camera. The first camera may send the encrypted version of the first set of the characters to the second camera. The second camera may perform the decrypting of the encrypted version of the first set of the characters. This embodiment may present a version of the proposed method according to which the first set of the characters may have a high protection. Providing the symmetric cryptographic key may be simpler than providing the common private key.

According to one embodiment, the method further comprises storing the hash value of the first string on a local memory of the first camera and encrypting the hash value of the second string dependent on a public key of the first camera. According to this embodiment, the method further comprises sending the encrypted hash value of the second string to the first camera, decrypting the encrypted hash value of the second string. The first camera may decrypt the encrypted hash value of the second string. According to this embodiment, the verifying may comprise comparing the hash value of the second string with the hash value of the first string by means of the first camera. Firstly, this embodiment may have the advantage that the hash value of the first string is not sent anywhere outside the first camera. This may enhance the data protection of the first set of the characters. Secondly, an encryption of the hash value of the second string may enhance the data protection of the second set of the characters. Thus, in addition to providing the tamper-proof evidence that the vehicle passed the first position or the second position by using the first character code for the hashing of the first string the data protection of the first and the second set of the characters may be increased by this embodiment.

According to one embodiment, the method may further comprise calculating a general time stamp by means of the first camera and calculating the general time stamp by means of the second camera. In this embodiment, the first string may comprise the general time stamp and the first set of the characters and may also be referred to as extended first string. Analogously, the second string may comprise the general time stamp and the second set of the characters and may also be referred to as extended second string. The first camera may calculate the general time stamp by rounding an actual time of a clock of the first camera up to the next full minute or second. Analogously, the second camera may calculate the general time stamp by rounding an actual time of a clock of the second camera up to the next full minute or second. In this case, the clock of the first camera and the clock of the second camera may be synchronized to the exact minute or second.

The general time stamp may allow to prove that the vehicle passed the first and the second position at approximately the time which is given by the general time stamp. Furthermore, according to this embodiment, as the first string and the second string comprise the first character code in addition to the general time stamp, this embodiment may provide a tamper-proof method to include the general time stamp in the secured file. Moreover, as the first and the second string are extended according to this embodiment, it may be more difficult to compromise the hash value of the first and the second string.

According to another example, the first signature may be a signature of the extended first string generated by means of the first character code as the common private key of the first camera and the second camera. Analogously, the second signature may be a signature of the extended second string generated by means of the first character code as the common private key.

According to one embodiment, the method may further comprise generating the first string and the second string such that the first string comprises an information about a location of a section of the road and the second string comprises the information about the location of the section of the road. According to this embodiment, the section of the road may comprise the first position and/or the second position. In one example, the information about the location of the section of the road may comprise the first GPS coordinates of the first position and/or the second GPS coordinates of the second position. The information about the location of the section of the road may allow to prove that a driver of the vehicle drove on the section of the road. Furthermore, according to this embodiment, as the first string and the second string comprise the first character code in addition to the information about the location of the section of the road, this embodiment may provide a tamper-proof method to include the information about the location of the section of the road in the secured file. Moreover, as the first and the second string are extended according to this embodiment, it may be more difficult to compromise the hash value of the first and the second string.

In a further variant of this embodiment, the first string may comprise the general time stamp, the information about the location of the section of the road and the first set of the characters and may also be referred to as further extended first string. Analogously, according to this variant of this embodiment, the second string may comprise the general time stamp, the information about the location of the section of the road and the second set of the characters and may also be referred to as further extended second string. Consequently, as the first and the second string may be further extended according to this variant of this embodiment, it may be even more difficult to compromise the hash value of the first and the second string.

According to another example, the first signature may be a signature of the further extended first string generated by means of the first character code as the common private key of the first camera and the second camera. Analogously, the second signature may be a signature of the further extended second string generated by means of the first character code as the common private key.

According to one embodiment, method may further comprise generating a further file comprising the characters of the number plate and the secured file. According to this embodiment, the generating of the speeding ticket may comprise encrypting the further file using a public key of a state authority, wherein the speeding ticket comprises the encrypted further file. In one example of this embodiment, the speeding ticket is designed as the encrypted further file. In another example, the speeding ticket may be the further file and the encrypted further file may represent the encrypted speeding ticket.

The term "state authority" as used herein may refer to any government entity which is in charge of controlling the speeding ticket. Encrypting the further file may enhance the data protection of the characters of the number plate. Furthermore, as the further file may comprise the secured file, this embodiment may allow to use the speeding ticket for proving that the vehicle passed the first position. For that, the encrypted further file may be decrypted using a private key of the state authority.

A proof that the vehicle passed the first position may be created by replicating the secured file in case the secured file comprises the hash value of the first string. This may be realized by replicating the secured file using the characters of the number plate given by the decrypted further file and the first character code and the hash function. As mentioned above, the first character code may be stored on the verification server of the state authority according to one example.

Furthermore, a proof that the vehicle passed the first position may be created by verifying the secured file in case the secured file comprises the first signature. This may be realized by verifying that the first set of the characters was signed by means of the first camera. Such a verifying may be performed using the characters of the number plate given by the decrypted further file and the public key of the first camera or the common public key of the first and the second camera. As mentioned above, the public key of the first camera or the common public key may be stored on the verification server of the state authority according to one example.

According to one embodiment, the generating of the further file may comprise generating a masked version of the first or second image dependent on the first or second image and the first character code and writing the masked version of the first or second image into the further file. The first or second image may allow to prove that a driver of the vehicle passed the first position. The masked version of the first or second image generated by means of the first character code may represent a tamper-proof version of the first or second image.

In one example, the first camera may generate the masked version of the first or second image in the form of a salted hash value of the first or second image. The first camera may execute the hash function or a first further hash function such that the input data of the hash function or of the first further hash function is a third string comprising pixel values of the first or second image and the first character code and the output value of the hash function or the first further hash function may be the hash value of the third string. In this example, the hash value of the third string may be the salted hash value of the first or second image.

According to another example, the first camera may generate the masked version of the first or second image in the form of a second further signature using the first character code as the private key of the first camera. In this example, the second further signature may be a signature of the pixel values of the first or second image.

According to one embodiment, the method may further comprise measuring the average speed of the vehicle and generating a masked version of the average speed dependent on the average speed and the first character code and writing the masked version of the average speed into the further file.

The evaluation unit may compute the average speed as described above. The average speed may serve as a proof that the vehicle violated the speed limit. The masked version of the average speed generated by means of the first character code may represent a tamper-proof version of the average speed.

In one example, the first camera may generate the masked version of the average speed in the form of a salted hash value of the average speed. The first camera may execute the hash function or a second further hash function such that the input data of the hash function or of the second further hash function is a fourth string comprising the average speed and the first character code and the output value of the hash function or the second further hash function may be the hash value of the fourth string. In this example, the hash value of the fourth string may be the salted hash value of the average speed.

According to another example, the first camera may generate the masked version of the average speed in the form of a third further signature using the first character code as the private key of the first camera. In this example, the third further signature may be a signature of the average speed.

According to one embodiment, the method may further comprise repeating the method for generating the speeding ticket, resulting in multiple respectively generated speeding tickets. The method may further comprise storing the speeding tickets together persistently as a whole such that the speeding tickets cannot be deleted or modified. Storing the speeding tickets together persistently as a whole may enhance a level of protection against forgery of a single speeding ticket of the multiple speeding tickets.

According to one embodiment, the speeding tickets may be stored together persistently as a whole in the form of a blockchain. A respective copy of the blockchain may be stored on a respective node of a blockchain network. Using the blockchain for storing the speeding tickets may have the advantage that in order to corrupt a single speeding ticket of the speeding tickets the whole blockchain has to be rebuilt, which is almost impossible. In order to rebuild the whole blockchain more than half of the nodes have to be compromised.

According to one embodiment, the speeding tickets may be stored together persistently as a whole in the form of an insert only database. The insert only database may be configured for only appending information to the insert only database. Using the insert only database for storing the speeding tickets persistently may need less resources compared to storing the speeding tickets in the form of a blockchain.

In one example, the repeating of the method for generating the speeding ticket, in the following also referred to as the repeating or repetition of the method, for generating the multiple speeding tickets may involve using the first and the second camera for each repetition of the method. In each repetition of the method a respective further speeding ticket may be created. Each of the further speeding tickets may be assigned to a respective further vehicle passing by the first and the second position of the road. Each further speeding ticket may comprise a respective further secured file which is generated dependent on the first character code according to this example. The respective further secured file may be created according to one of the variants described above.

In another example, performing the repetitions of the method may involve using multiple pairs of cameras, wherein each pair of cameras comprises a first camera and a second camera. Each repetition of the method for generating the respective further speeding ticket may comprise: generating a respective further first image of at least a part of a respective further vehicle by means of the first camera of the respective pair of cameras, wherein the first camera of the respective pair of cameras is arranged at a respective further first position of the road and comprises a respective further persistent memory device storing a respective further first character code persistently in a hard-wired manner and inaccessibly from outside the first camera of the respective pair of cameras and the part of the respective further vehicle comprises a number plate of the respective further vehicle and the number plate of the respective further vehicle comprises characters; detecting a respective further first set of the characters of the number plate of the respective further vehicle dependent on the respective further first image; generating a respective further secured file by means of the first camera of the respective pair of cameras using the respective further first set of the characters and the respective further first character code, the respective further secured file comprising a masked version of the respective further first set of the characters; generating a respective further second image of the part of the respective further vehicle by means of a second camera of the respective pair of cameras, wherein the second camera of the respective pair of cameras is arranged at a respective further second position of the road; detecting a respective further second set of the characters of the number plate of the respective further vehicle dependent on the respective further second image; verifying that the respective further first set of the characters is equal to the respective further second set of the characters using the respective further secured file and the respective further second set of the characters; checking whether the respective further vehicle violates a speed limit dependent on an information about an average speed of the respective further vehicle between the respective further first position and the respective further second position; and generating the respective further speeding ticket in case the respective further vehicle violates the speed limit and in case of verifying that the respective further first set of the characters is equal to the respective further second set of the characters.

FIG. 1 depicts a system 10 for generating a speeding ticket 80 (shown in 10). The system 10 may comprise a first camera 1 and a second camera 2. The first camera 1 may be configured for generating a first image 11 (shown in FIG. 2) of at least a part 3 of a vehicle 4. The first camera 1 may be arranged at a first position 21 of a road 23 and comprises a persistent memory device 31 storing a first character code 41 persistently in a hard-wired manner and inaccessibly from outside the first camera 1. In one example, the persistent memory device 31, in the following also referred to as first persistent memory 31, may be designed in the form of a diode matrix or a mask ROM.

Figure 2:
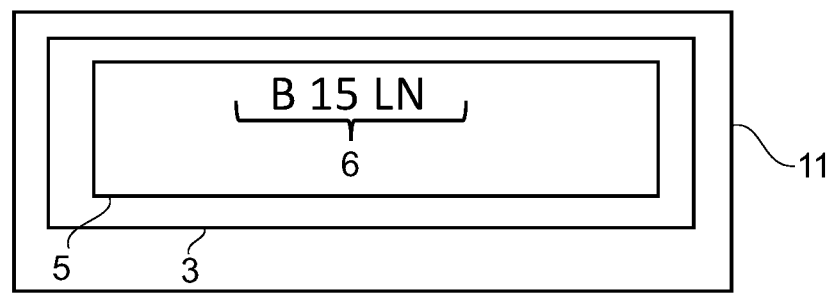
FIG. 2 depicts a first image capturing a number plate of the vehicle shown in FIG. 1.
Figure 3:
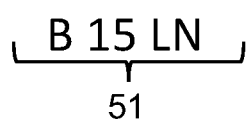
FIG. 3 depicts a detected first set of characters of the number plate shown in FIG. 2.
Figure 4:
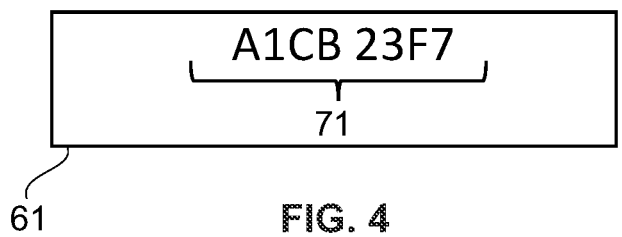
FIG. 4 depicts a secured file generated using the first set of characters shown in FIG. 3.

The part 3 of the vehicle 4 comprises a number plate 5 of the vehicle 4, and the number plate 5 comprises characters 6, as shown in FIG. 2. The first camera 1 may be configured for detecting a first set of the characters 51 (shown in FIG. 3) of the number plate 5 of the vehicle 4, dependent on the first image 11 shown in FIG. 2. Furthermore, the first camera 1 may be configured for generating a secured file 61 using the first set of the characters 51 (shown in FIG. 3) of the number plate 5 and the first character code 41. The secured file 61, depicted in FIG. 4, may comprise a masked version of the first set of the characters 71 of the number plate 5.

The second camera 2 may be configured for generating a second image 12 (shown in FIG. 5) of at least the part 3 of a vehicle 4. The second camera 2 may be arranged at a second position 22 of the road 23. The second camera 2 may be configured for detecting a second set of the characters 52 (shown in FIG. 6) of the number plate 5 of the vehicle 4 dependent on the second image 12 (shown in FIG. 5).

Figure 6:
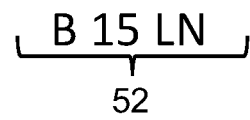
FIG. 6 depicts a detected second set of characters of the number plate shown in FIG. 5.

The system 10, and in one example an evaluation unit 7 of the system 10, may be configured for verifying that the first set of the characters 51 (shown in FIG. 3) is equal to the second set of the characters 52 (shown in FIG. 6) using the secured file 61 and the second set of the characters 52 (shown in FIG. 6).

Furthermore, the system 10, and in one example the evaluation unit 7, may be configured for checking whether the vehicle 4 violates a speed limit dependent on an information about an average speed of the vehicle 4 between the first position 21 and the second position 22. The first position 21 and the second position 22 are drawn in the form of sections of the road 23 comprising the first camera 1 and the second camera 2, respectively.

In addition, the system 10 may be configured for generating the speeding ticket 80 (shown in FIG. 10-FIG. 13) in case the vehicle 4 violates the speed limit and in case of verifying that the first set of the characters 51 is equal to the second set of the characters 52.

Figure 7:
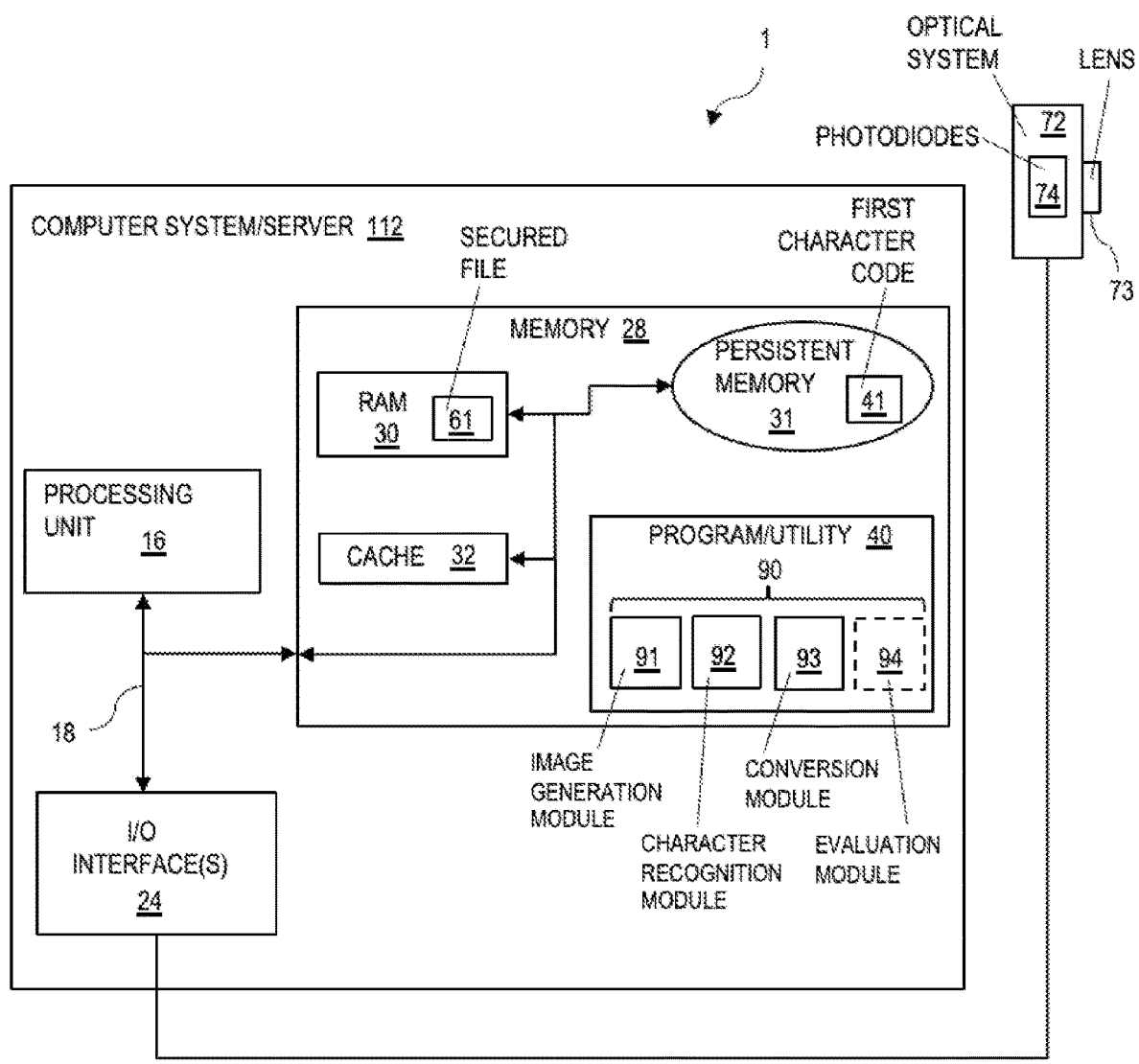
FIG. 7 depicts a block diagram of the first camera shown in FIG. 1.

FIG. 7 depicts an example of the first camera 1. According to this example, the first camera 1 may comprise a computer system 112, in the following referred to as first computer system 112.

The first computer system 112 may be described in the general context of computer system executable instructions, such as program modules, being executed by a computer system. Generally, program modules may include routines, programs, objects, components, logic, data structures, and so on that perform particular tasks or implement particular abstract data types.

The components of the first computer system 112 may include, but are not limited to, one or more processors or processing unit 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

First computer system 112 typically includes a variety of computer system readable media. Such media may be any available media that is accessible by first computer system 112, and may include both volatile and non-volatile media.

The system memory 28 may include readable media in the form of volatile memory, such as random access memory (RAM) 30 and/or cache memory 32. The first computer system 112 may further include other volatile/non-volatile computer system storage media. As will be further depicted and described below, memory 28 may include at least one program product having a set (e.g., at least one) of program modules that are configured to carry out at least a part of the functions of embodiments of the invention.

A program/utility 40 of the first computer system 112, having a set (at least one) of program modules 90, may be stored in memory 28 by way of example. The program/utility may comprise an operating system, further program modules and/or program data. The program modules 90 may generally be configured to carry out a part of the functions and/or methodologies of embodiments of the invention as described herein.

FIG. 7 shows a variant according to which the first persistent memory 31 is a part of the system memory 28. For example, the first persistent memory 31 may be mounted on a circuit board comprising the RAM 30 and the cache 32. In a further variant, the first persistent memory 31 may be installed within the first camera 1 and may be mounted externally from the first computer system 112 having a connection to the first computer system 112.

In one example, the first camera 1 may comprise an optical system 72 with at least one lens 73 and photodiodes 74. The lens 73 may capture light which is reflected by the part 3 of the vehicle 4 and may direct the captured light to the photodiodes 74 for generating electronical output signals of the optical system 72 dependent on a design of the part 3 of the vehicle 4. The optical system 72 may send the electronical output signals of the optical system 72 to an interface 24 of the first computer system 112.

The first computer system 112 may comprise an image generation module 91. The processor 16 may compute the first image 11 (shown in FIG. 2) in the form of first pixel values dependent on the electronical output signals of the optical system 72 when executing the image generation module 91. In response to generating the first image 11 the processor 16 may generate a first time stamp and store the first image 11 in the form of a first image file, for example in the RAM 30.

Furthermore, the first camera 1 may comprise a character recognition module 92 for recognizing the characters 6 of the number plate 5 (shown in FIG. 2). The processor 16 may read and process the first image file and perform a pattern recognition algorithm for recognizing each character of the characters 6 of the number plate 5 when executing the recognition module 92. The characters 6 of the number plate 5 detected, i.e., recognized, by means of the first camera 1 are labelled as the first set of the characters 51 (shown in FIG. 3).

In addition, the first camera 1 may comprise a conversion module 93 for generating the secured file 61 dependent on the first set of the characters 51 and the first character code 41.

Figure 8:
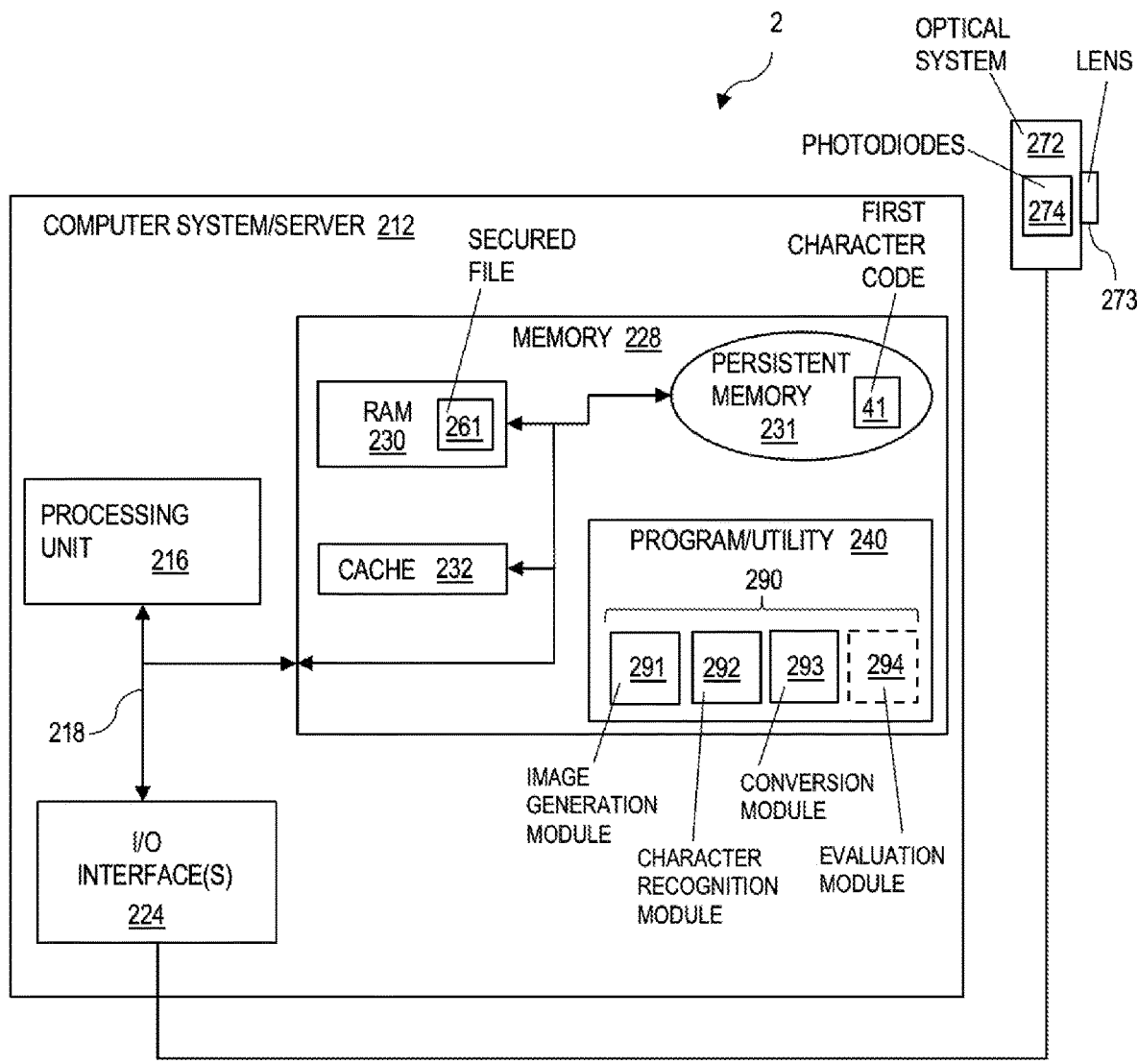
FIG. 8 depicts a block diagram of the second camera shown in FIG. 1.

FIG. 8 depicts an example of the second camera 2. According to this example, the second camera 2 may comprise a computer system 212, in the following referred to as second computer system 212, as shown in FIG. 8.

The second computer system 212 may be described in the general context of computer system executable instructions, such as program modules, being executed by a computer system. Generally, program modules may include routines, programs, objects, components, logic, data structures, and so on that perform particular tasks or implement particular abstract data types.

The components of the second computer system 212 may include, but are not limited to, one or more processors or processing unit 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Second computer system 212 typically includes a variety of computer system readable media. Such media may be any available media that is accessible by second computer system 212, and may include both volatile and non-volatile media.

The system memory 228 may include readable media in the form of volatile memory, such as random access memory (RAM) 230 and/or cache memory 232. The second computer system 212 may further include other volatile/non-volatile computer system storage media. As will be further depicted and described below, memory 228 may include at least one program product having a set (e.g., at least one) of program modules that are configured to carry out at least a part of the functions of embodiments of the invention.

A program/utility 240 of the second computer system 212, having a set (at least one) of program modules 290, may be stored in memory 228 by way of example. The program/utility may comprise an operating system, further program modules and/or program data. The program modules 290 may generally be configured to carry out a part of the functions and/or methodologies of embodiments of the invention as described herein.

In one example, the second camera 2 may comprise an optical system 272 with at least one lens 273 and photodiodes 274. The lens 273 may capture light which is reflected by the part 3 of the vehicle 4 when the vehicle passes the second position 22. Furthermore, the lens 273 may direct the captured light to the photodiodes 274 for generating electronical output signals of the optical system 272 dependent on a design of the part 3 of the vehicle 4. The optical system 272 may send the electronical output signals of the optical system 272 to an interface 224 of the second computer system 212.

The second computer system 212 may comprise an image generation module 291. The processor 216 may compute the second image 12 (shown in FIG. 5) in the form of second pixel values dependent on the electronical output signals of the optical system 272 when executing the image generation module 291. In response to generating the second image 12 the processor 216 may generate a second time stamp and store the second image 12 in the form of a second image file, for example in the RAM 230.

Figure 5:
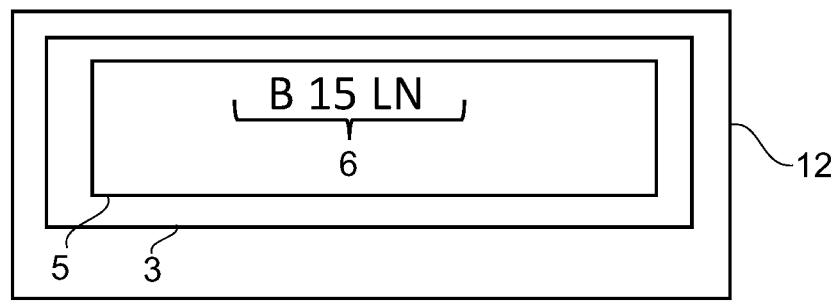
FIG. 5 depicts a second image capturing the number plate of the vehicle shown in FIG. 1.

Furthermore, the second camera 2 may comprise a character recognition module 292 for recognizing the characters 6 of the number plate 5 (shown in FIG. 5). The processor 216 may read and process the second image file and perform a pattern recognition algorithm for recognizing each character of the characters 6 of the number plate 5 when executing the recognition module 292. The characters 6 of the number plate 5 detected, i.e., recognized, by means of the second camera 2 are labelled as the second set of the characters 52 (shown in FIG. 6).

In addition, the first camera 1 may comprise a conversion module 293 for generating the secured file 261 dependent on the first set of the characters 51 and the first character code 41.

Figure 9:
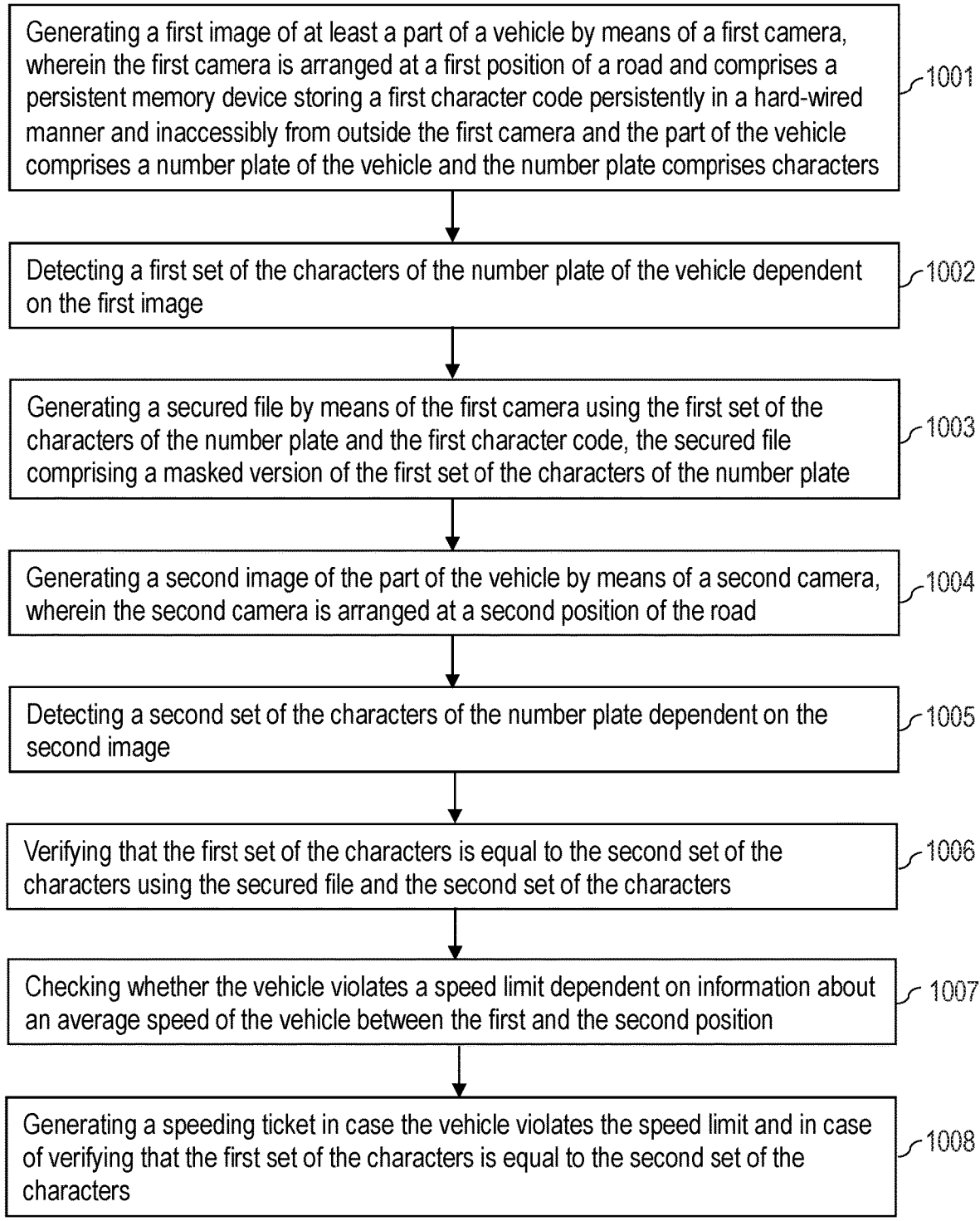
FIG. 9 is a flowchart of a method for generating a speeding ticket for a vehicle.

FIG. 9 shows a flowchart of a method for generating a speeding ticket, for example the speeding ticket 80.

In step 1001, the first image 11 of at least the part 3 of the vehicle 4 may be generated by means of the first camera 1. The first camera 1 may be arranged at the first position 21 of the road 23 and may comprise the persistent memory device 31 storing the first character code 41 persistently in a hard-wired manner and inaccessibly from outside the first camera 1. The part 3 of the vehicle 4 may comprise the number plate 5 of the vehicle 4, and the number plate 5 may comprise the characters 6.

In step 1002, a first set of the characters 51 of the number plate 5 of the vehicle 4 may be detected dependent on the first image 11.

In step 1003, the secured file 61 may be generated by means of the first camera 1 using the first set of the characters 51 of the number plate 5 and the first character code 41. The secured file 61 may comprise the masked version of the first set of the characters 71 of the number plate 5.

In step 1004, the second image 12 of the part 3 of the vehicle 4 may be generated by means of the second camera 2. The second camera 2 may be arranged at the second position 22 of the road 23.

In step 1005, the second set of the characters 52 of the number plate 5 may be detected dependent on the second image 12.

In step 1006, verifying that the first set of the characters 51 is equal to the second set of the characters 52 may be performed using the secured file 61 and the second set of the characters 52.

In step 1007, checking whether the vehicle 4 violates a speed limit may be performed dependent on an information about an average speed of the vehicle 4 between the first position 21 and the second position 22.

In step 1008, the speeding ticket 80 may be generated in case the vehicle 4 violates the speed limit and in case of verifying that the first set of the characters 51 is equal to the second set of the characters 52.

The numeration of the steps 1001, 1002, 1003, 1004, 1005, 1006, 1007, and 1008 does not prescribe an order of execution of these steps. For example, step 1004 and step 1005 may be performed before step 1001, 1002 and 1003. In this case, the first camera 1 and the second camera 2 may be located at the road 23 such that the vehicle 4 may pass the second camera 2 before the vehicle 4 may pass the first camera 1.

In one example, step 1001 may be performed using the optical system 72 and the image generation module 91 as described above. Furthermore, in one example, step 1002 may be performed executing the recognition module 92 by means of the processor 16. Step 1003 may be performed executing the conversion module 93. Step 1004 may be performed using the optical system 272 and the image generation module 291 as described above. Furthermore, in one example, step 1005 may be performed executing the recognition module 292 by means of the processor 216.

In the following, several examples are described how the first character code 41 may be used to generate the secured file 61. The verifying may be performed according to a manner how the secured file 61 is generated by means of the first camera 1.

According to a first variant, the conversion module 93 may comprise a hash function, for example the secure hash algorithm (SHA)-256. The processor 16 may construct a first string by concatenating the first set of the characters 51, and the first character code 41. Furthermore, the processor 16 may generate a hash value of the first string by executing the hash function. According to the first variant, the hash value of the first string may represent the masked version of the first set of the characters 71. The processor 16 may write the hash value of the first string into the secured file 61 according to the first variant. In one example, the processor 16 may store the secured file 61 in the RAM 30.

Alternatively, or in addition, the first camera 1 may send the secured file 61 to the evaluation unit 7. The evaluation unit 7 may store the secured file 61 in a memory device 70 of the evaluation unit 7. The evaluation unit 7 may be configured to automatically delete the secured file 61 in the memory device 70 after a given time span has passed. The given time span is equal to the shortest possible time span for driving with the vehicle 4 on the road 23 from the first position 21 to the second position 22 without violating the speed limit.

According to one example, the processor 16 may calculate a general time stamp, for example by rounding an actual time of a clock of the processor 16 up to the next full minute or second. In this example, the processor 16 may construct the first string by concatenating the first set of the characters 51, the first character code 41, and the general time stamp.

Furthermore, according to a further variant, the processor 16 may construct the first string by concatenating the first set of the characters 51, the first character code 41, the general time stamp, and an information about a location of a section of the road 23. The section of the road may comprise the first position 21 and/or the second position 22. In one example, the information about the location of the section of the road 23 may be GPS coordinates of an area comprising the first position 21 and the second position 22.

According to the first variant, the second camera 2 may comprise a conversion module 293 and a persistent memory device 231 storing a first character code 41 persistently in a hard-wired manner and inaccessibly from outside the second camera 2. In one example, the persistent memory device 231, in the following also referred to as second persistent memory 231, may be designed in the form of a diode matrix or a mask ROM.

According to the first variant, the conversion module 293 may comprise the hash function. The processor 216 may construct a second string by concatenating the second set of the characters 52 and the first character code 41. Furthermore, the processor 16 may generate a hash value of the second string, in the following also referred to as second hash value 1000, by executing the hash function. According to the first variant, the second hash value 1000 may represent a masked version of the second set of the characters 52. The second camera 2 may send the second hash value 1000 to the evaluation unit 7.

According to one example, the processor 216 may calculate the general time stamp, for example by rounding an actual time of a clock of the processor 216 up to the next full minute or second. In this example, the processor 216 may construct the second string by concatenating the second set of the characters 52, the first character code 41, and the general time stamp.

Furthermore, according to a further variant, the processor 216 may construct the second string by concatenating the second set of the characters 52, the first character code 41, the general time stamp, and the information about the location of the section of the road 23. The processor 16 may be configured to compute the GPS coordinates of the area comprising the first position 21 and the second position 22 based on the GPS coordinates of the first position 21 and a given size of the area using a rounding algorithm. Similarly, the processor 216 may be configured to compute the GPS coordinates of the area comprising the first position 21 and the second position 22 based on the GPS coordinates of the second position 22 and the given size of the area using the rounding algorithm.

According to the first variant, the evaluation unit 7 may perform the verifying whether the first set of the characters 51 is equal to the second set of the characters 52 by comparing the hash value of the first string with the second hash value 1000. To realize this, a processing unit 75 of the evaluation unit 7 may send a reading command to the memory device 70 for reading the secured file 61 from the memory device 70 into the processing unit 75. If the reading command is executed successfully, this may indicate that the vehicle 4 violates the speed limit. The reading command may only be executed successfully if the secured file 61 has not been deleted before executing the reading command. In response to reading the secured file 61, the processing unit 75 may compare the hash value of the first string with the second hash value 1000. The processing unit 75 may read the hash value of the first string by reading the secured file 61 from the memory device 70. If the hash value of the first string is equal to the second hash value 1000, then the verifying may be completed. If the hash value of the first string is not equal to the second hash value 1000, then the verifying may not be completed.

In one variant, step 1007, i.e., checking whether the vehicle 4 violates the speed limit, may be performed by performing step 1006, i.e., verifying that the first set of the characters 51 is equal to the second set of the characters 52. Such a variant may be provided by providing the evaluation unit 7 such that the evaluation unit 7 is configured to automatically delete the secured file 61 in the memory device 70 after the given time span has passed as mentioned above. If the reading command for reading the secured file 61 from the memory device 70 is successful and the reading command is initiated after generating the second image 12, then a successfully performed reading of the secured file 61 may be considered as the information about the average speed of the vehicle 4 between the first position 21 and the second position 22. In this case, the information about the average speed of the vehicle 4 may be such that the average speed of the vehicle 4 between the first position 21 and the second position 22 is higher than the speed limit.

According to a further example, the system 10 may be configured to calculate a value of the average speed 81 of the vehicle 4. In one example, the system 10, for example the evaluation unit 7, may compute the value of the average speed 81 of the vehicle 4 as a quotient of the a fixed length between the first position 21 and the second position 22 and a time difference between a first point of time indicated by the first time stamp and a second point of time indicated by the second time stamp. In one example, the first camera 1 may send the first time stamp to the evaluation unit 7, and the second camera 2 may send the second time stamp to the evaluation unit 7.

The evaluation unit 7 may generate the speeding ticket 80 if the verifying is completed, i.e., in case of verifying that the first set of the characters 51 is equal to the second set of the characters 52, and if the vehicle 4 violates the speed limit. As mentioned above, according to one example, the vehicle 4 violates the speed limit if the reading of the secured file 61 is successful after the second image 12 has been generated. In another example, the evaluation unit 7 may compute the value of the average speed 81 of the vehicle 4 and compare the average speed with the speed limit in order to check whether the vehicle 4 violates the speed limit.

Figure 10:
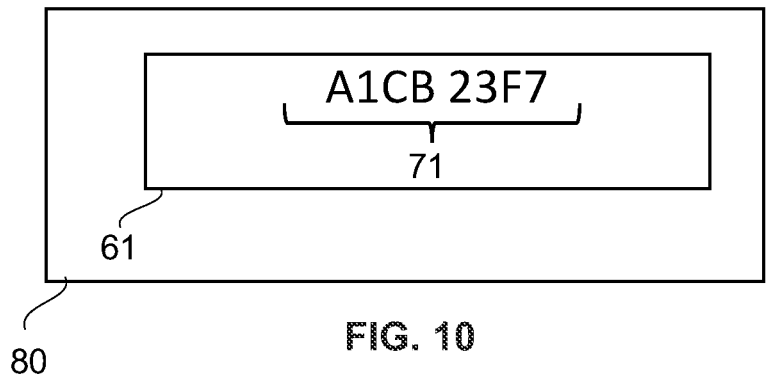
FIG. 10 depicts an example of a speeding ticket.
Figure 11:
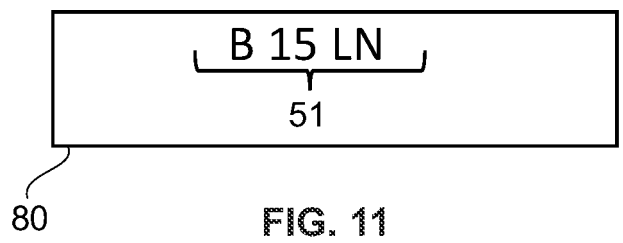
FIG. 11 depicts a further example of a speeding ticket.
Figure 12:
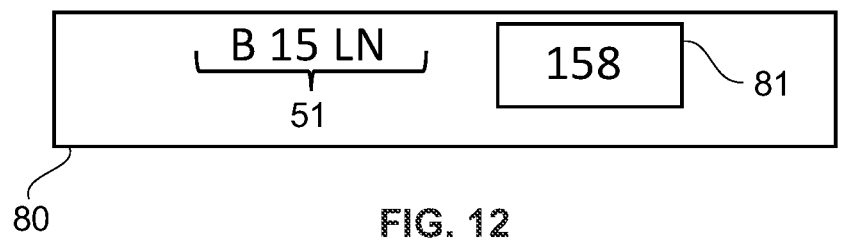
FIG. 12 depicts a further example of a speeding ticket.

The speeding ticket 80 may comprise the masked version of the first set of the characters 71, for example in the form of the secured file 61, as shown in FIG. 10. According to a further example, shown in FIG. 11, the speeding ticket 80 may comprise the characters 6 of the number plate 5 in the form of the first set of the characters 51 or the second set of the characters 52. FIG. 12 depicts a further example according to which the speeding ticket 80 may comprise the characters 6 of the number plate 5 in the form of the first set of the characters 51 or the second set of the characters 52 and the value of the average speed 81.

Figure 13:
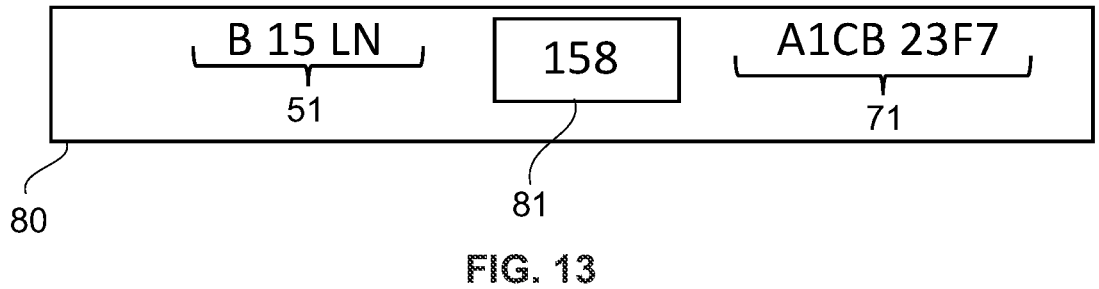
FIG. 13 depicts a further example of a speeding ticket.
Figure 14:
FIG. 14 depicts a verification server of a state authority for verifying the speeding ticket shown in FIG. 10.

In most cases, the evaluation unit 7 may generate the speeding ticket 80, as depicted in FIG. 13, such that the speeding ticket may comprise the masked version of the first set of the characters 71, the value of the average speed 81, the characters 6 of the number plate 5 in the form of the first set of the characters 51 or the second set of the characters 52 and the first time stamp and/or the second time stamp not shown in FIG. 13. Furthermore, the speeding ticket 80 may comprise the first image 11 and/or the second image 12 and/or a geolocation of the first position 21 and/or the second position 22, which is not shown in the figures.

Generally, the speeding ticket 80 may comprise the first time stamp, the value of the average speed 81, the first image 11 and/or the geolocation of the first position in form of a respective hashed format. To realize this, the first camera 1 may generate a respective concatenated string by concatenating the first time stamp, the value of the average speed 81, the first image 11 and/or the geolocation of the first position respectively with the first character code 41. In order to create the respective hashed format, the first camera 1 may compute a respective hashed value of the concatenated string comprising the first time stamp, the value of the average speed 81, the first image 11, and the geolocation of the first position respectively using the hash function.

In FIG. 1, the evaluation unit 7 is depicted in a location of an exterior environment of the first camera 1 and the second camera 2. However, this is not a necessity. The evaluation unit 7 may be arranged within the first camera 1, for example in the form of an evaluation module 94, shown in dashed lines in FIG. 7. The evaluation module 94 may be configured to perform the verifying, the checking whether the vehicle 4 violates the speed limit and a writing of the speeding ticket 80. In this case, the processor 16 may perform the functions of the processing unit 75 and the second camera 2 may send the second hash value 1000 to the first camera 1. In a further example, the evaluation unit 7 may be arranged within the second camera 2, for example in the form of the evaluation module 94, shown in dashed lines in FIG. 8. In this case, the first camera 1 may send the secured file 61 to the second camera 2. Analogously, the evaluation module 94 of the second camera 2 may be configured to perform the verifying, the checking whether the vehicle 4 violates the speed limit and a writing of the speeding ticket 80.

In one example, the system 10 may send the speeding ticket 80 to a verification server 140, for example by means of the evaluation unit 7 or the first camera 1 or the second camera 2. The state authority may have access to the verification server 140 for verifying the speeding ticket 80. The verification server 140 may store the first character code 41 for performing a verification of the speeding ticket 80.

Figure 15:
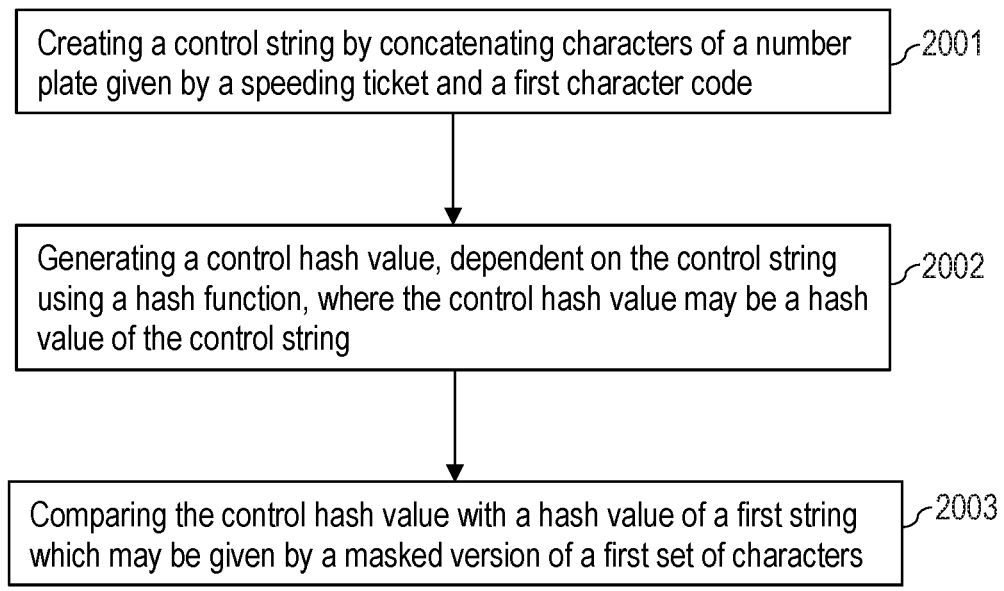
FIG. 15 is a flowchart of a method for verifying the speeding ticket shown in FIG. 10.

FIG. 15 shows a flowchart of a method for verifying the speeding ticket 80. In step 2001, with respect to the first variant, a control string may be created by concatenating the characters 6 of the number plate 5 given by the speeding ticket 80 and the first character code 41. In step 2002, a control hash value may be generated dependent on the control string using the hash function. The control hash value may be the hash value of the control string. In step 2003, the control hash value may be compared with the hash value of the first string which may be given by the masked version of the first set of the characters 71 according to the first variant. The masked version of the first set of the characters 71 may be included in the speeding ticket 80. If the control hash value is equal to the hash value of the first string, then the speeding ticket 80 may be considered as being verified. Moreover, the verification that the control hash value is equal to the hash value of the first string may be considered as a verification that the vehicle 4 passed the first position 21, i.e., that the masked version of the first set of the characters 71 was generated by means of the first camera 1. A verification of the respective hashed formats mentioned above may be performed analogously.

In one example, the evaluation unit 7 may encrypt the speeding ticket 80 using a public key 82 of the state authority. The verification server 140 may store the private key 83 of the state authority and may decrypt the encrypted speeding ticket 80 using the private key 83.

According to a second variant, the conversion module 93 may comprise a signature algorithm for signing the first set of the characters 51. According to the second variant, the first character code 41 may be designed in the form of a common private key shared between the first camera 1 and the second camera 2. The processor 16 may sign the first set of the characters 51 dependent on the common private key executing the signature algorithm of the conversion module 93. The processor 16 may compute a first signature as a result of signing the first set of the characters 51 by means of the common private key. According to the second variant, the first signature may represent the masked version of the first set of the characters 71. The processor 16 may write the first signature into the secured file 61 according to the second variant. In one example, the processor 16 may store the secured file 61 in the RAM 30.

According to the second variant, the conversion module 293 may comprise a signature algorithm for signing the first set of the characters 51. Furthermore, according to the second variant, the second camera 2 may comprise the persistent memory device 231 storing the first character code 41 as the common private key persistently in a hard-wired manner and inaccessibly from outside the second camera 2. The processor 216 may sign the second set of the characters 52 dependent on the common private key executing the signature algorithm of the conversion module 293. The processor 16 may compute a second signature 2000 as a result of signing the second set of the characters 52 by means of the common private key.

According to the second variant, the second signature 2000 may represent a masked version of the second set of the characters 52. The second camera 2 may send the second signature 2000 to the evaluation unit 7, as depicted in dashed lines in FIG. 1.

According to the second variant, the evaluation unit 7 may perform the verifying whether the first set of the characters 51 is equal to the second set of the characters 52 by comparing the first signature with the second signature 2000. To realize this, the processing unit 75 of the evaluation unit 7 may send the reading command to the memory device 70 for reading the secured file 61 from the memory device 70 into the processing unit 75. In response to reading the secured file 61, the processing unit 75 may compare the first signature with the second signature 2000. If the first signature is equal to the second signature 2000, then the verifying may be completed. If the first signature is not equal to the second signature 2000, then the verifying may not be completed.

According to both variants, the first and the second variant, the first camera 1 and the second camera 2 may together represent an individual pair of cameras, wherein the first character code is generated uniquely for this individual pair.

According to a further example, the first character code 41 may be a private key of the first camera 1. In this case, the evaluation unit 7 may store a public key of the first camera 1 which corresponds to the private key of the first camera, for example in the second persistent memory 231. According to this further example, the processor 16 may generate the secured file 61 such that the secured file 61 comprises a first further signature. The processor 16 may compute the first further signature by signing the first set of the characters 51 using the private key of the first camera 1. The first camera 1 may send the secured file to the evaluation unit 7. The evaluation unit 7 may verify the first further signature. The evaluation unit 7 may verify the first further signature by means of the first further signature, the public key of the first camera and the second set of the characters 52. The second camera 2 may send the second set of the characters 52 to the evaluation unit 7. In another example, in case the evaluation unit 7 is comprised by the second camera 2, for example in the form of the evaluation module 294, the first camera 1 may send the secured file 61 to the second camera 2.

In a further example, the processor 16 may store the hash value of the first string locally in the system memory 28. The second camera 2 may encrypt the hash value of the second string using a public key of the first camera 1 and may send the encrypted hash value of the second string to the first camera 1. The processor 16 may decrypt the encrypted hash value of the second string and may perform the verifying by comparing the hash value of the second string with the hash value of the first string. According to this further example, the evaluation unit 7 may be comprised by the first camera 1, for example in the form of the evaluation module 94.

Figure 16:
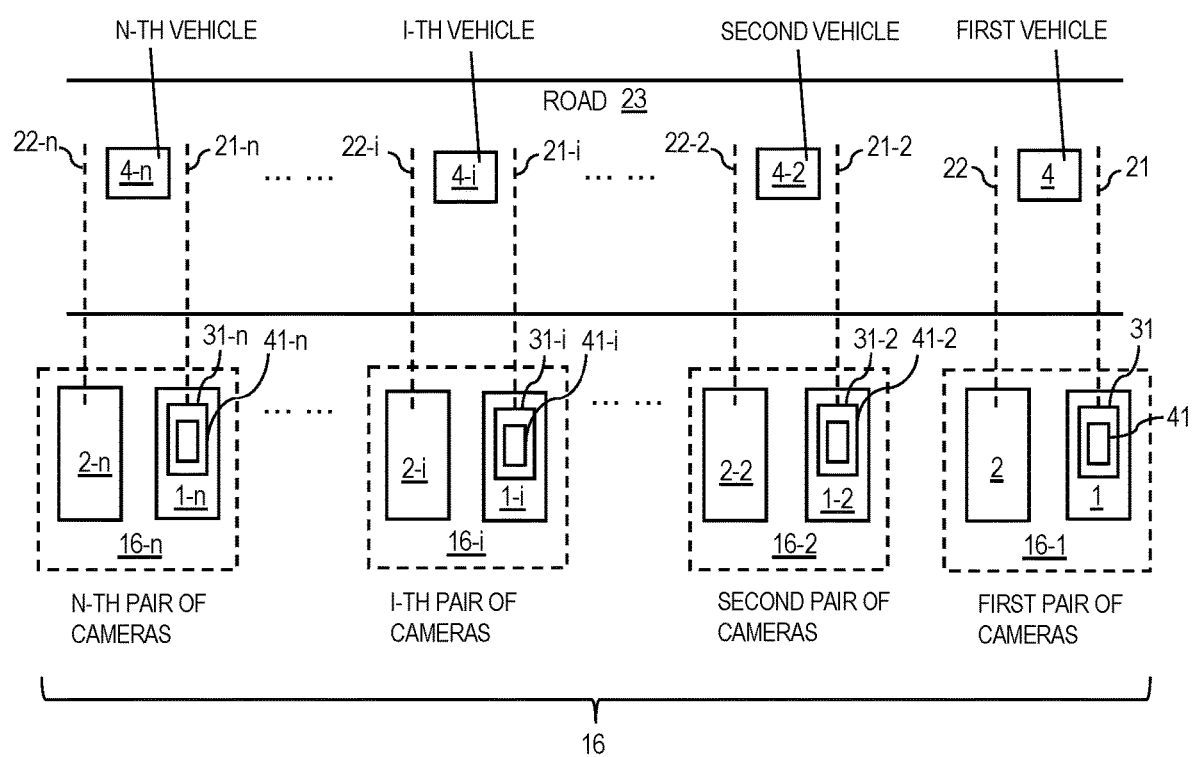
FIG. 16 depicts a further example of the system shown in FIG. 1 with several pairs of cameras for generating multiple speeding tickets shown in FIG. 18.

FIG. 16 depicts a variant of the system 10 according to which the system 10 may comprise multiple pairs 16 of cameras, wherein each pair of the pairs 16 of cameras comprises a first camera and a second camera. For example, a first pair 16-1 of cameras may comprise the first camera 1 and the second camera 2. An n-th pair 16-n of cameras may comprise a first camera 1-n and a second camera 2-n, a second pair 16-2 of cameras may comprise a first camera 1-2 and a second camera 2-2, and an i-th pair 16-i of cameras may comprise a first camera 1-i and a second camera 2-i.

The multiple pairs 16 of cameras may be used to generate multiple speeding tickets. For example, in addition to the speeding ticket 80, further speeding tickets 80-2, ..., 80-i, ..., 80-n (shown in FIG. 17 and FIG. 18) may be generated for further vehicles 4-2, ..., 4-i, ..., 4-n. The index "i" is used to describe a respective one of the further pairs 16-2, ..., 16-i, ..., 16-n of cameras, a respective one of the further speeding tickets 80-2, ..., 80-i, ..., 80-n or a respective one of the further vehicles 4-2, ..., 4-i, ..., 4-n. The further speeding tickets 80-2, ..., 80-i, ..., 80-n may be created similarly to the speeding ticket 80, for example according to the first or the second variant described above, as follows.

In one example, a respective further first image of at least a part of the respective further vehicle 4-i may be generated by means of the first camera 1-i of the respective pair 16-i of cameras. The first cameras 1, 1-2, ..., 4-i, ..., 4-n of the respective pairs 16, 16-2, ..., 16-i, ..., 16-n of cameras are arranged at a respective first positions 21, 16-2, ..., 16-i, ..., 16-n of the road 23 and comprise respective persistent memory devices 31, 31-2, ..., 31-i, ..., 31-n storing respective first character codes 41, 41-2, ..., 41-i, ..., 41-n persistently in a hard-wired manner and inaccessibly from outside the first cameras. The part of the respective further vehicle 4-i may comprise a number plate of the respective further vehicle 4-i, and the number plate of the respective further vehicle 4-i comprises characters.

Furthermore, in one example, a respective further first set of the characters of the number plate of the respective further vehicle 4-i may be detected dependent on the respective further first image.

Furthermore, in one example, a respective further secured file may be generated by means of the first camera 1-i of the respective pair 16-i of cameras using the respective further first set of the characters and the respective further first character code 41-i. The respective further secured file may comprise a masked version of the respective further first set of the characters.

Furthermore, in one example, a respective further second image of the part of the respective further vehicle 4-i may be generated by means of a second camera 2-i of the respective pair 16-i of cameras. The second camera 2-i of the respective pair 16-i of cameras may be arranged at a respective further second position 22-i of the road 23.

Furthermore, in one example, a respective further second set of the characters of the number plate of the respective further vehicle 4-i may be detected dependent on the respective further second image.

Furthermore, in one example, a respective further verifying that the respective further first set of the characters is equal to the respective further second set of the characters may be performed using the respective further secured file and the respective further second set of the characters. In one example, the evaluation units 7, 7-2, ..., 7-i, ..., 7-n (shown in FIG. 17) may perform the respective further verifying. The respective further evaluation unit 7-i may be arranged within the first or second camera of the respective pair 16-i of cameras or outside the first and second camera of the respective pair 16-i of cameras.

Furthermore, in one example, a respective further checking whether the respective further vehicle 4-i violates a speed limit may be performed dependent on an information about an average speed of the respective further vehicle 4-i between the respective further first position and the respective further second position.

Furthermore, in one example, the respective further speeding ticket 80-i may be generated in case the respective further vehicle 4-i violates the speed limit and in case of verifying that the respective further first set of the characters is equal to the respective further second set of the characters. The evaluation unit 7 or the respective further evaluation unit 7-i may generate the respective further speeding ticket 80-i.

Figure 17:
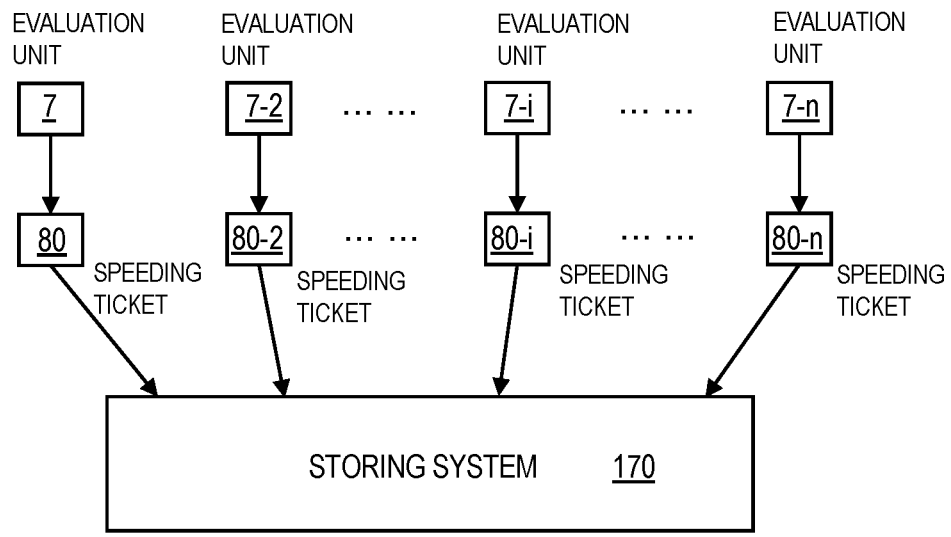
FIG. 17 depicts several evaluation units for generating multiple speeding tickets shown in FIG. 18.

FIG. 17 depicts a variant according to which the respective further evaluation units 7-i may be arranged outside the first and second camera of the respective pair 16-i of cameras. Similarly to the evaluation unit 7, the respective further evaluation units 7-i may encrypt the respective further speeding ticket 80-i using the public key 82 of the state authority and send the respective further speeding ticket 80-i to a storing system 170 of the state authority. The storing system 170 may be configured to store the speeding tickets 80, 80-2, ..., 80-i, ..., 80-n together persistently as a whole such that the speeding tickets 80, 80-2, ..., 80-i, ..., 80-n cannot be deleted or modified.

In one example, the verification server 140 may store the respective further first character code 41-i of the first camera of the respective pair 16-i of cameras. In this example, the state authority may be able to verify that the respective further secured file is generated by means of the first camera of the respective pair 16-i of cameras.

Figure 18:
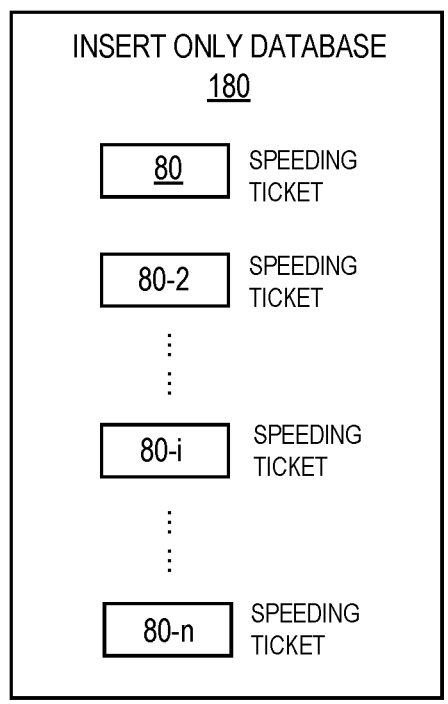
FIG. 18 depicts multiple speeding tickets generated by means of the system shown in FIG. 16.

According to one example, the storing system 170 may comprise an insert only database 180, depicted in FIG. 18. The insert only database 180 may be configured for only appending information to the insert only database 180. Once the respective speeding ticket 80-i is added to the insert only database 180, the respective speeding ticket 80-i cannot be modified or removed from the insert only database 180.

Figure 19:
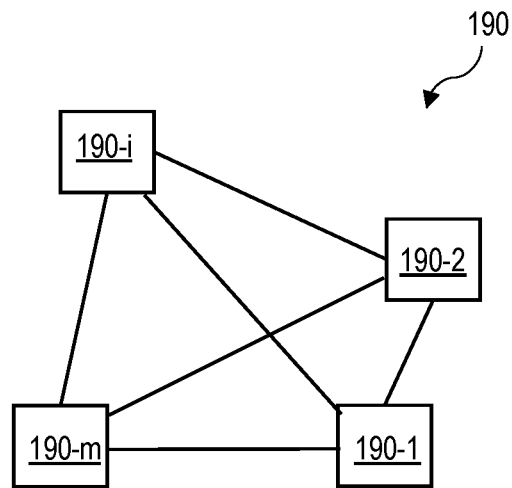
FIG. 19 depicts a blockchain network for storing the multiple speeding tickets shown in FIG. 18 persistently.
Figure 20:
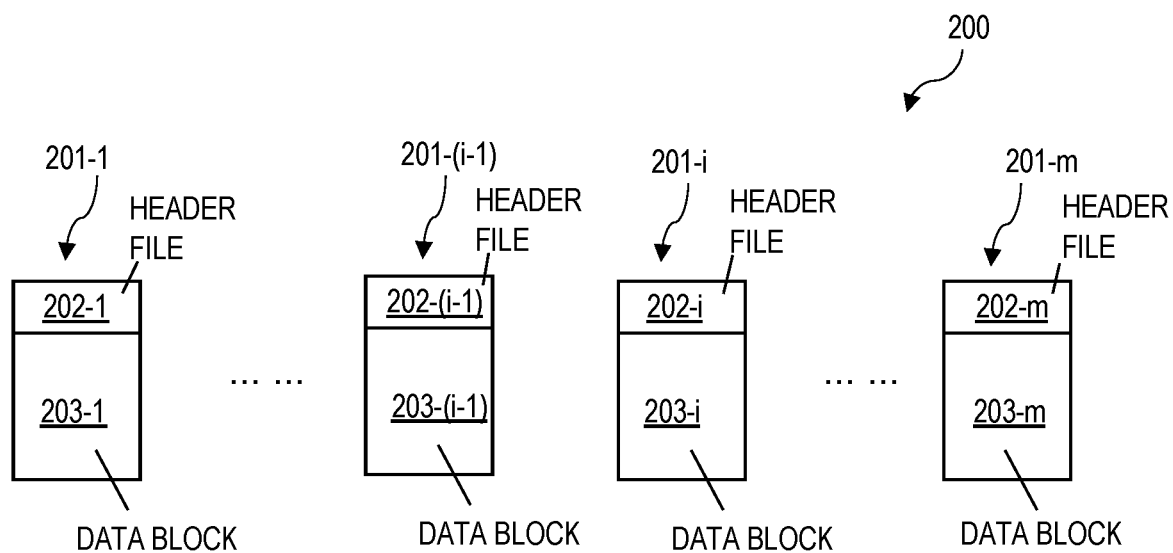
FIG. 20 depicts a blockchain comprising blockchain elements for storing the multiple speeding tickets shown in FIG. 18 persistently.

According to a further example, the storing system 170 may be designed in the form of a blockchain network 190 as shown in FIG. 19. The blockchain network 190, which comprises entities 190-1, 190-2 ..., 190-i, ..., 190-m, may store several copies of the speeding tickets 80, 80-2, ..., 80-i, ..., 80-n. Each copy of the speeding tickets 80, 80-2, ..., 80-i, ..., 80-n may be arranged in the form of a blockchain 200, as shown in FIG. 20, and may be stored on a respective entity 190-i of the blockchain network 190. The respective entity 190-i may be a server of a respective county of a state, in one example.

The blockchain 200 may comprise blockchain elements 201-1, ..., 201-i, ..., 201-m. The blockchain elements 201-1, ..., 201-i, ..., 201-m may comprise header files 202-1, ..., 202-i, ..., 202-m and data blocks 203-1, ..., 203-i, ..., 203-m. The respective data block 201-i may comprise a respective set of the speeding tickets 80, 80-2, ..., 80-i, ..., 80-n. The sets of the speeding tickets 80, 80-2, ..., 80-i, ..., 80-n of different data blocks of the data blocks 203-1, ..., 203-i, ..., 203-m may be disjoint. The respective header file 202-1, ..., 202-i, ..., 202-m may comprise a respective block hash value. The respective block hash value may be a hash value of the data given by the set of the speeding tickets 80, 80-2, ..., 80-i, ..., 80-n of the respective data block 201-i.

The respective header file 201-$i$ may comprise descriptive data such as a time stamp of the respective blockchain element 201-$i$ and a chain element hash value of a respective preceding blockchain element 201-($i$–1). The preceding blockchain element 201-($i$–1) precedes the respective blockchain element 201-$i$ within the blockchain 200. The chain element hash value of the respective preceding blockchain element 201-($i$–1) may be a hash value of data which comprises descriptive data of a header file of the respective preceding blockchain element 201-($i$–1), such as a time stamp of the respective preceding blockchain element 201-($i$–1), and a block hash value of the respective preceding blockchain element 201-($i$–1). The block hash value of the respective preceding blockchain element 201-($i$–1) may be a hash value of data given by the set of the speeding tickets 80, 80-2, ..., 80-$i$, ..., 80-$n$ of the data block 201$_{i-1}$ of the respective preceding blockchain element 201-($i$–1).

What is claimed is:

1. A computer-implemented method for generating a speeding ticket, the method comprising:
    generating a first image of at least a part of a vehicle by a first camera, wherein the first camera is arranged at a first position of a road, wherein the part of the vehicle comprises a number plate of the vehicle and the number plate comprises characters;
    detecting a first set of the characters of the number plate of the vehicle dependent on the first image;
    generating a secured file by the first camera using the first set of the characters of the number plate and a first character code, the secured file comprising a masked version of the first set of the characters of the number plate;
    generating a second image of the part of the vehicle by a second camera, wherein the second camera is arranged at a second position of the road;
    detecting a second set of the characters of the number plate dependent on the second image;
    verifying whether the first set of the characters is equal to the second set of the characters, using the secured file;
    checking whether the vehicle violates a speed limit dependent on information about an average speed of the vehicle between the first position and the second position;
    generating the speeding ticket, in response to determining that the vehicle violates the speed limit and in response to verifying that the first set of the characters is equal to the second set of the characters;
    generating a signature of the first set of the characters, using the first character code as a common private key of the first camera and the second camera, wherein the secured file comprises the signature of the first set of the characters;
    generating a signature of the second set of the characters using the first character code;
    comparing the signature of the first set of the characters with the signature of the second set of the characters;
    wherein the first camera comprises a first persistent memory device storing a first character code and inaccessible from outside the first camera; and
    wherein the second camera comprises a second persistent memory device storing the first character code and inaccessibly from outside the second camera.

2. The computer-implemented method of claim 1, further comprising:
    storing the secured file in a memory device;
    automatically deleting the secured file in the memory device, after a given time span; and
    wherein the given time span is equal to a shortest possible time span for driving on the road from the first position to the second position without violating the speed limit, wherein checking whether the vehicle violates the speed limit comprises a successful reading of the secured file from the memory device.

3. The computer-implemented method of claim 1, further comprising:
    generating a first string comprising the first character code and the first set of the characters;
    computing a hash value of the first string, by the first camera using a hash function, wherein the secured file comprises the hash value of the first string;
    generating a second string comprising the first character code and the second set of the characters;
    computing a hash value of the second string, by the second camera using the hash function;
    comparing the hash value of the first string with the hash value of the second string;
    wherein the first camera comprises a first persistent memory device storing the first character code and inaccessible from outside the first camera;
    wherein the second camera comprises a second persistent memory device storing the first character code and inaccessibly from outside the second camera; and
    wherein the first character code is generated uniquely for the first camera and the second camera.

4. The computer-implemented method of claim 3, further comprising:
    storing the hash value of the first string locally in the first camera; and
    sending the hash value of the second string from the second camera to the first camera.

5. The computer-implemented method of claim 3, further comprising:
    storing the hash value of the first string on local memory of the first camera; encrypting the hash value of the second string dependent on a public key of the first camera,
    sending an encrypted hash value of the second string to the first camera;
    decrypting the encrypted hash value of the second string; and
    comparing the hash value of the second string with the hash value of the first string by the first camera.

6. The computer-implemented method of claim 3, further comprising:
    calculating a general time stamp by the first camera; and
    calculating the general time stamp by the second camera, wherein the first string comprises the general time stamp and the second string comprises the general time stamp.

7. The computer-implemented method of claim 3, further comprising:
    generating the first string and the second string such that the first string comprises information about a location of a section of the road and the second string comprises the information about the location of the section of the road, wherein the section of the road comprises the first position and the second position.

8. The computer-implemented method of claim 1, further comprising:
    storing the signature of the first set of the characters locally in the first camera; and sending the signature of the second set of the characters from the second camera to the first camera.

9. The computer-implemented method of claim 1, wherein the first character code is generated uniquely for the first camera and the second camera.

10. The computer-implemented method of claim 1, further comprising:
generating a signature of the first set of the characters, using the first character code as a private key of the first camera, wherein the secured file comprises the signature of the first set of the characters;
verifying the signature of the first set of the characters by a public key of the first camera corresponding to the private key of the first camera; and
wherein the first character code is generated uniquely for the first camera and the second camera.

11. The computer-implemented method of claim 1, further comprising:
generating an encrypted version of the first set of the characters, using the first character code as a symmetric cryptographic key of the first camera and the second camera, wherein the secured file comprises the encrypted version of the first set of the characters;
decrypting the encrypted version of the first set of the characters, by the first character code;
wherein the first camera comprises a first persistent memory device storing the first character code and inaccessible from outside the first camera;
wherein the second camera comprises a second persistent memory device storing the first character code and inaccessibly from outside the second camera; and
wherein the first character code is generated uniquely for the first camera and the second camera.

12. The computer-implemented method of claim 1, further comprising:
generating a file comprising the characters of the number plate and the secured file,
encrypting the file using a public key of a state authority, for generating the speeding ticket; and
wherein the speeding ticket comprises the encrypted file.

13. The computer-implemented method of claim 12, further comprising:
generating a masked version of the first image or the second image, dependent on the first image or second image and the first character code;
writing the masked version of the first image or the second image into the file; and
wherein the first character code is generated uniquely for the first camera and the second camera.

14. The computer-implemented method of claim 12, further comprising:
measuring the average speed of the vehicle;
generating a masked version of the average speed, dependent on the average speed and the first character code;
writing the masked version of the average speed into the file; and
wherein the first character code is generated uniquely for the first camera and the second camera.

15. The computer-implemented method of claim 1, further comprising:
generating multiple speeding tickets; and
storing the multiple speeding tickets together persistently as a whole such that the multiple speeding tickets cannot be deleted or modified.

16. The computer-implemented method of claim 15, wherein the multiple speeding tickets are stored together persistently as a whole in a form of a blockchain.

17. The computer-implemented method of claim 15, wherein the multiple speeding tickets are stored together persistently as a whole in a form of an insert only database, wherein the insert only database is configured for only appending information to the insert only database.

18. A camera system, the camera system being configured for:
generating a first image of at least a part of a vehicle by a first camera, wherein the first camera is arranged at a first position of a road, wherein the part of the vehicle comprises a number plate of the vehicle and the number plate comprises characters;
detecting a first set of the characters of the number plate of the vehicle dependent on the first image;
generating a secured file by the first camera using the first set of the characters of the number plate and a first character code, wherein the secured file comprises a masked version of the first set of the characters of the number plate;
generating a second image of the part of the vehicle by a second camera, wherein the second camera is arranged at a second position of the road;
detecting a second set of the characters of the number plate dependent on the second image;
verifying whether the first set of the characters is equal to the second set of the characters, using the secured file;
checking whether the vehicle violates a speed limit dependent on information about an average speed of the vehicle between the first position and the second position;
generating the speeding ticket, in response to determining that the vehicle violates the speed limit and in response to verifying that the first set of the characters is equal to the second set of the characters;
generating a signature of the first set of the characters, using the first character code as a common private key of the first camera and the second camera, wherein the secured file comprises the signature of the first set of the characters;
generating a signature of the second set of the characters using the first character code;
comparing the signature of the first set of the characters with the signature of the second set of the characters;
wherein the first camera comprises a first persistent memory device storing a first character code and inaccessible from outside the first camera; and
wherein the second camera comprises a second persistent memory device storing the first character code and inaccessibly from outside the second camera.

19. A system for generating a speeding ticket, the system comprising a first camera and a second camera, the system being configured for:
generating a first image of at least a part of a vehicle by a first camera, wherein the first camera is arranged at a first position of a road, wherein the part of the vehicle comprises a number plate of the vehicle and the number plate comprises characters;
detecting a first set of the characters of the number plate of the vehicle dependent on the first image;
generating a secured file by the first camera using the first set of the characters of the number plate and a first character code, the secured file comprising a masked version of the first set of the characters of the number plate;
generating a second image of the part of the vehicle by a second camera, wherein the second camera is arranged at a second position of the road;
detecting a second set of the characters of the number plate dependent on the second image;

verifying whether the first set of the characters is equal to the second set of the characters, using the secured file;

checking whether the vehicle violates a speed limit dependent on information about an average speed of the vehicle between the first position and the second position;

generating the speeding ticket, in response to determining that the vehicle violates the speed limit and in response to verifying that the first set of the characters is equal to the second set of the characters;

generating a signature of the first set of the characters, using the first character code as a common private key of the first camera and the second camera, wherein the secured file comprises the signature of the first set of the characters;

generating a signature of the second set of the characters using the first character code;

comparing the signature of the first set of the characters with the signature of the second set of the characters;

wherein the first camera comprises a first persistent memory device storing a first character code and inaccessible from outside the first camera; and wherein the second camera comprises a second persistent memory device storing the first character code and inaccessibly from outside the second camera.

* * * * *